US012027762B2

(12) United States Patent
Parsche

(10) Patent No.: US 12,027,762 B2
(45) Date of Patent: Jul. 2, 2024

(54) COMMUNICATIONS DEVICE WITH HELICALLY WOUND CONDUCTIVE STRIP WITH LENS AND RELATED ANTENNA DEVICE AND METHOD

(71) Applicant: Eagle Technology, LLC, Melbourne, FL (US)

(72) Inventor: Francis E. Parsche, Palm Bay, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 85 days.

(21) Appl. No.: 17/650,574

(22) Filed: Feb. 10, 2022

(65) Prior Publication Data

US 2023/0253700 A1 Aug. 10, 2023

(51) Int. Cl.
*H01Q 1/36* (2006.01)
*H01Q 1/48* (2006.01)
*H01Q 11/08* (2006.01)
*H01Q 1/28* (2006.01)

(52) U.S. Cl.
CPC ............... *H01Q 1/362* (2013.01); *H01Q 1/48* (2013.01); *H01Q 11/08* (2013.01); *H01Q 1/288* (2013.01)

(58) Field of Classification Search
CPC .......... H01Q 1/362; H01Q 1/48; H01Q 11/08; H01Q 1/288
See application file for complete search history.

(56) References Cited

U.S. PATENT DOCUMENTS 3,573,840 A 4/1971 Gouillou et al.
3,962,748 A 6/1976 Michaels
4,494,117 A 1/1985 Coleman
4,667,440 A 5/1987 Grace, Sr.
4,825,219 A 4/1989 Ajioka
4,872,020 A 10/1989 Ajioka
5,329,287 A 7/1994 Strickland
5,345,248 A 9/1994 Hwang et al.
5,479,182 A * 12/1995 Sydor .................. H01Q 11/083 343/895
5,892,480 A 4/1999 Killen
5,924,324 A 7/1999 Kilker et al.
(Continued)

FOREIGN PATENT DOCUMENTS

CN 101060203 10/2007
CN 103299481 9/2013
(Continued)

OTHER PUBLICATIONS

U.S. Appl. No. 18/048,070, filed Oct. 20, 2022 Francis Parsche.
(Continued)

*Primary Examiner* — Hoang V Nguyen
*Assistant Examiner* — Yonchan J Kim
(74) *Attorney, Agent, or Firm* — ALLEN, DYER, DOPPELT + GILCHRIST, P.A. Attorneys at Law

(57) ABSTRACT

A communications device includes an RF device, and an antenna coupled to the RF device. The antenna includes a conductive ground plane, an elongate support extending from the conductive ground plane, a helically wound conductive strip carried by a proximal end of the elongate support, and spaced apart conductive elements carried by a distal end of the elongate support to define an RF lens for the helically wound conductive strip.

22 Claims, 19 Drawing Sheets

(56) References Cited

U.S. PATENT DOCUMENTS

| | | | |
|---|---|---|---|
| 5,928,000 A | 7/1999 | Rudisill et al. | |
| 5,933,096 A | 8/1999 | Tsuda | |
| 6,094,178 A | 7/2000 | Sanford | |
| 6,320,552 B1 * | 11/2001 | Volman | H01Q 11/08 343/895 |
| 6,344,834 B1 | 2/2002 | Josypenko | |
| 6,353,419 B1 | 3/2002 | Gates et al. | |
| 6,653,987 B1 | 11/2003 | Lamensdorf et al. | |
| 6,688,408 B2 | 2/2004 | Barbera et al. | |
| 6,689,125 B1 | 2/2004 | Keith et al. | |
| 6,765,541 B1 | 7/2004 | Josypenko | |
| 6,805,695 B2 | 10/2004 | Keith et al. | |
| 6,891,516 B1 | 5/2005 | Saunders et al. | |
| 6,897,822 B2 | 5/2005 | Sparks | |
| 6,912,287 B1 | 6/2005 | Fukumoto et al. | |
| 6,975,281 B2 | 12/2005 | Neel | |
| 7,038,636 B2 | 5/2006 | Larouche et al. | |
| 7,126,557 B2 | 10/2006 | Warnagiris | |
| 7,151,505 B2 | 12/2006 | Jostell et al. | |
| 7,158,093 B2 | 1/2007 | Yang et al. | |
| 7,158,819 B1 | 1/2007 | Pulimi et al. | |
| 7,183,998 B2 | 2/2007 | Wilhelm et al. | |
| 7,253,787 B2 | 8/2007 | Liu et al. | |
| 7,292,203 B2 | 11/2007 | Craggs et al. | |
| 7,427,962 B2 | 9/2008 | Yang | |
| 7,515,113 B2 | 4/2009 | Petros | |
| 7,536,020 B2 | 5/2009 | Fukumoto et al. | |
| 7,753,941 B2 | 7/2010 | Keith et al. | |
| 7,887,271 B2 | 2/2011 | Perkin et al. | |
| 7,905,923 B2 | 3/2011 | Keith et al. | |
| RE42,533 E | 7/2011 | Josypenko | |
| 8,022,890 B2 | 9/2011 | Bondyopadhyay | |
| 8,156,972 B2 | 4/2012 | Burns et al. | |
| 8,267,812 B1 | 9/2012 | Sery | |
| 8,314,750 B1 | 11/2012 | Josypenko | |
| 8,315,713 B2 | 11/2012 | Burnes et al. | |
| 8,436,784 B2 | 5/2013 | Jalali Mazlouman et al. | |
| 8,460,214 B2 | 6/2013 | Kuban et al. | |
| 8,525,751 B1 | 9/2013 | Josypenko | |
| 8,532,793 B2 | 9/2013 | Morris et al. | |
| 8,547,291 B1 | 10/2013 | Josypenko | |
| 8,617,153 B2 | 12/2013 | Lee et al. | |
| 8,777,939 B2 | 7/2014 | Lee et al. | |
| 8,786,503 B2 | 7/2014 | Apostolos et al. | |
| 8,800,111 B2 | 8/2014 | Haylock et al. | |
| 8,836,600 B2 | 9/2014 | Lafleur | |
| 8,847,832 B2 | 9/2014 | Parsche et al. | |
| 8,863,450 B2 | 10/2014 | Anderson et al. | |
| 8,915,268 B2 | 12/2014 | Burns et al. | |
| 8,974,316 B2 | 3/2015 | Sery | |
| D738,358 S | 9/2015 | Schmidt | |
| 9,209,521 B2 | 12/2015 | Hung et al. | |
| 9,214,734 B2 | 12/2015 | Huynh | |
| 9,220,562 B2 | 12/2015 | Brannan et al. | |
| 9,264,090 B2 | 2/2016 | Johnson et al. | |
| 9,287,614 B2 | 3/2016 | Vahidpour et al. | |
| D758,356 S | 6/2016 | Schmidt | |
| 9,358,066 B2 | 6/2016 | Brannan | |
| 9,362,972 B2 | 6/2016 | Johnson et al. | |
| 9,375,275 B2 | 6/2016 | Lee et al. | |
| 9,387,038 B2 | 7/2016 | Brannan et al. | |
| 9,553,360 B1 | 1/2017 | Huang et al. | |
| 9,561,369 B2 | 2/2017 | Burnes et al. | |
| 9,572,982 B2 | 2/2017 | Burnes et al. | |
| 9,680,224 B2 | 6/2017 | Parsche et al. | |
| 9,700,374 B2 | 7/2017 | Lee et al. | |
| 9,722,297 B2 | 8/2017 | Yung et al. | |
| 9,728,847 B2 | 8/2017 | Hung et al. | |
| 9,793,612 B1 | 10/2017 | Siripuram | |
| 9,899,746 B2 | 2/2018 | Grandfield et al. | |
| 9,960,494 B2 | 5/2018 | Tatarnikov et al. | |
| 10,028,787 B2 | 7/2018 | Lee et al. | |
| 10,044,107 B2 | 8/2018 | Elliot et al. | |
| 10,079,433 B2 | 9/2018 | Ohgren et al. | |
| 10,165,630 B2 | 12/2018 | Okoniewski et al. | |
| 10,226,296 B2 | 3/2019 | Brannan et al. | |
| 10,314,652 B2 | 6/2019 | Brannan | |
| 10,321,956 B2 | 6/2019 | Brannan et al. | |
| 10,363,094 B2 | 7/2019 | Brannan et al. | |
| 10,381,737 B2 | 8/2019 | Tawk et al. | |
| 10,396,446 B2 | 8/2019 | Yoon et al. | |
| 10,424,836 B2 | 9/2019 | McMichael et al. | |
| 10,441,746 B2 | 10/2019 | Besselink | |
| 10,483,631 B2 | 11/2019 | McMichael et al. | |
| 10,511,099 B2 | 12/2019 | Klein et al. | |
| 10,574,339 B2 | 2/2020 | Chandra et al. | |
| 10,627,198 B2 | 4/2020 | Rovinsky | |
| 10,765,348 B2 | 9/2020 | Antonio et al. | |
| 10,892,545 B1 * | 1/2021 | Parsche | H01Q 1/12 |
| 10,916,856 B1 | 2/2021 | Sayem et al. | |
| 10,931,019 B1 | 2/2021 | Kefauver et al. | |
| 11,187,507 B2 | 11/2021 | Rovinsky | |
| 11,217,882 B2 | 1/2022 | Luo et al. | |
| 11,234,765 B2 | 2/2022 | Brannan et al. | |
| 11,241,557 B2 | 2/2022 | Besselink | |
| 2006/0050009 A1 | 3/2006 | Ho et al. | |
| 2010/0134378 A1 | 6/2010 | Duchesne et al. | |
| 2018/0076528 A1 * | 3/2018 | Tawk | H01Q 15/16 |
| 2020/0038630 A1 | 2/2020 | Besselink | |

FOREIGN PATENT DOCUMENTS

| | | |
|---|---|---|
| CN | 104022360 | 9/2014 |
| CN | 206098687 | 4/2017 |
| DE | 1466271 | 1/1969 |
| DE | 2412139 | 9/1974 |
| DE | 2611380 | 9/1977 |

OTHER PUBLICATIONS

Chen et al. "Transmission line analysis of the Archimedean spiral antenna in free space" Journal of Electromagnetic Waves and Applications, 28:10, 1175-1193, DOI: 10.1080/09205071.2014.909295 Abstract Only.

H. Yagi "Beam Transmission of Ultra Short Waves" Proceedings of the Institute of Radio Engineers (vol. 16, Issue: 6, Jun. 1928) Abstract Only.

Ho et al. "A novel crank quadrifilar slot antenna for GPS hand-held receivers" 1998 IEEE-APS Conference on Antennas and Propagation for Wireless Communications; Abstract Only.

Hong et al. "Miniaturized circularly polarized microstrip antenna by spirally slotted" Business 2015 IEEE 4th Asia-Pacific Conference on Antennas and Propagation (APCAP): Jun. 1, 2015; Abstract Only.

John Kraus, "Antennas" McGraw Hill 2nd Edition: copyright 1988, chapter 13, pp. 624-627 http://antena.fe.uni-lj.si/literatura/ar/Antennas_mcgraw-hill_2nd_ed_1988-john_d_kraus.pdf.

K.P. Ray "Research activities on antennas in SAMEER" 2008 International Conference on Recent Advances in Microwave Theory and Applications: Abstract Only.

Lee et al. "Helical Slot Antenna for the Microwave Ablation" Business, Physics International Journal of Antennas and Propagation: Oct. 30, 2019; Abstract Only.

Li et al. "A single-band and dual-band circular polarized antenna by using asymmetric-circular shaped slots" Conference: 2016 IEEE 5th Asia-Pacific Conference on Antennas and Propagation (APCAP): Jul. 2016; Abstract Only.

Lukin et al. "Synthetic aperture antenna for near field applications" Business; 4th International Conference on Antenna Theory and Techniques: Oct. 27, 2003 Abstract Only.

R.K. Zimmerman "Traveling-wave analysis of a bifilar scanning helical antenna" IEEE Transactions on Antennas and Propagation ( vol. 48, Issue: 6, Jun. 2000) Abstract Only.

Tutorialspoint.com "Antenna Theory—Helica" retrieved from internet Nov. 10, 2022 https://www.tutorialspoint.com/antenna_theory/antenna_theory_helical.htm; pp. 4.

Yu et al. "Design of a slot-coupled radial line helical array antenna for high power microwave applications" AIP Advances 7, 095101 (2017); pp. 11.

(56) References Cited

OTHER PUBLICATIONS

U.S. Appl. No. 18/048,092, filed Oct. 20, 2022 Francis Parsche.
John D. Kraus "Helical Beam Antennas for Wide-Band Applications" Proceedings of the Institute of Radio Engineers, 36, pp. 1236-1242, Oct. 1948.
W.W. Hansen, J.R. "A New Principle in Directional Antenna Design" Woodward, Proceedings of the Institute of Radio Engineers, 1938, vol. 26, issue 3 pp. 343-345.
Ehrenspeck et al. "Two-dimensional End Fire Array With Increased Gain and Side lobe Reduction" Wescon/57 conference record, vol. 1, pp. 217-229.
U.S. Appl. No. 17/447,830, filed Sep. 16, 2021 Francis E. Parsche.

* cited by examiner

COMMUNICATIONS DEVICE WITH HELICALLY WOUND CONDUCTIVE STRIP WITH LENS AND RELATED ANTENNA DEVICE AND METHOD

TECHNICAL FIELD

The present disclosure relates to the field of communications, and, more particularly, to a wireless communications device and related methods.

BACKGROUND

Space antenna assemblies for satellite-to-ground links typically require a single directive beam, high gain, low mass, and high reliability. Elongate antennas may sometimes be used. Circular polarization can be desirable for satellite-to-earth links as circular polarization mitigates against the Faraday Rotation of waves passing through the ionosphere. Yagi-Uda antennas are an elongate antenna of high directivity for size that can provide circular polarization by a turnstile feature. In turnstile antenna, two Yagi-Uda antennas are mounted at right angles to each other on a common boom, fed equal amplitude and phased 0, 90 degrees by a feeding network. Yagi-Uda antennas may be limited in bandwidth. While the Yagi director elements usefully provide an artificial lens, the director elements are sharply tuned.

Although the field of antennas is approximately 130 years old, the antennas types and their design may remain artisan in nature. Radiation pattern requirements may not indicate all possible the antenna shapes that are useful to meet the radiation requirement. For instance, Fourier Transform techniques may refer a radiation pattern shape to a planar antenna aperture current distribution yet the Fourier Transform may not easily define or devise an end fire antenna.

It seems there was a golden age in which many of the Euclidian geometries were implemented in metal and used as antennas with useful results. Examples may be the line based wire dipole, circular loop, conical horn, and parabolic reflector etc. The Euclidian shapes offer optimizations of shortest distance between two points for the line dipole and in turn perhaps maximum radiation resistance for length, most area enclosed for least circumference for circular loops and circular patches, and maximum directivity for aperture area.

A prior art antenna providing circular polarization is an axial mode wire helix antenna. An example is disclosed in "Helical Beam Antennas For Wide-Band Applications", John D. Kraus, Proceedings Of The Institute Of Radio Engineers, 36, pp 1236-1242, October 1948. In the book, "Antennas", McGraw Hill, 1st Edition, the same John D. Kraus describes seeing a wire helix used in a traveling wave tube. It struck him to see if the helix would function as antenna. The resulting axial mode wire helix antenna was useful for forming directive beams with a helix diameter between about 0.8 and 1.3 wavelengths and a winding pitch angle of between 13 and 17 degrees. Radiation is emitted in an end fire mode, for example, along the axis of the helix, and a directive single main beam is created. Potential drawbacks may exist for the simple axial mode wire helix: realized gain is nearly 3 dB less than a Yagi-Uda antenna of the same length; the driving point resistance of the helix is near 130 ohms not 50 ohms; metal supports for the helix conductor may be disabling; and a direct current ground is not provided to drain space charging.

An improvement to the wire axial mode helix is found in U.S. Pat. No. 5,892,480 to Killen, assigned to the present application's assignee. This approach for a directional antenna comprises a helix-shaped antenna. Although this antenna is directional, the gain and bandwidth performance may be less than desirable.

Referring briefly to FIGS. 3A-3B, another existing approach discloses a helix-shaped antenna 100. This antenna 100 includes a helix-shaped conductor 101, and a conductive plane 102 coupled to the helix-shaped conductor. Diagram 150 shows gain performance for the antenna 100. The provided gain has a non-flat profile, which is less desirable in radio design.

Continued growth and demand for bandwidth has led to new commercial satellite constellations. For example, the O3b satellite constellation is deployed in a medium earth orbit (MEO), and the OneWeb satellite constellation is to be deployed in a low earth orbit (LEO). A more compact antenna assembly reduces the size and weight of the satellites, as well as costs.

SUMMARY

Generally, a communications device includes a radio frequency (RF) device, and an antenna coupled to the RF device. The antenna includes a conductive ground plane, an elongate support extending from the conductive ground plane, a helically wound conductive strip carried by a proximal end of the elongate support, and a plurality of spaced apart conductive elements carried by a distal end of the elongate support to define an RF lens for the helically wound conductive strip.

More specifically, the conductive ground plane may have a width greater than a diameter of the helically wound conductive strip. Each of the plurality of spaced apart conductive elements may include a circle-shaped conductive element. The helically wound conductive strip may define an imaginary cylinder having a diameter greater than a diameter of each of the plurality of spaced apart conductive elements.

In some embodiments, the communications device may comprise a coaxial cable coupling the RF device and the antenna. The coaxial cable may include an inner conductor and an outer conductor surrounding the inner conductor. The outer conductor may be coupled to the conductive ground plane, and the inner conductor may extend through the conductive ground plane and be coupled to a proximal end of the helically wound conductive strip.

Also, the proximal end of the helically wound conductive strip may define a gap with adjacent portions of the conductive ground plane. The elongate support may comprise a conductive material or a dielectric material. The antenna may have an operating frequency. For example, each of the plurality of spaced apart conductive elements may have a circumference between 0.9 and 1.1 wavelengths of the operating frequency. Adjacent spaced apart conductive elements may have a spacing between 0.1 and 0.3 wavelengths of the operating frequency. The helically wound conductive strip may have a diameter between 0.3 and 0.6 wavelengths of the operating frequency.

Another aspect is directed to an antenna device for an RF device. The antenna device comprises a conductive ground plane, an elongate support extending from the conductive ground plane, and a helically wound conductive strip carried by a proximal end of the elongate support. The antenna further includes a plurality of spaced apart conductive elements carried by a distal end of the elongate support to define an RF lens for the helically wound conductive strip.

Yet another aspect is directed to a method for making an antenna for a communications device. The method comprises coupling a helically wound conductive strip around a proximal end of an elongate support carried by a conductive ground plane. The method further comprises coupling a plurality of spaced apart conductive elements to a distal end of the elongate support to define an RF lens for the helically wound conductive strip.

DETAILED DESCRIPTION

Figure 1:
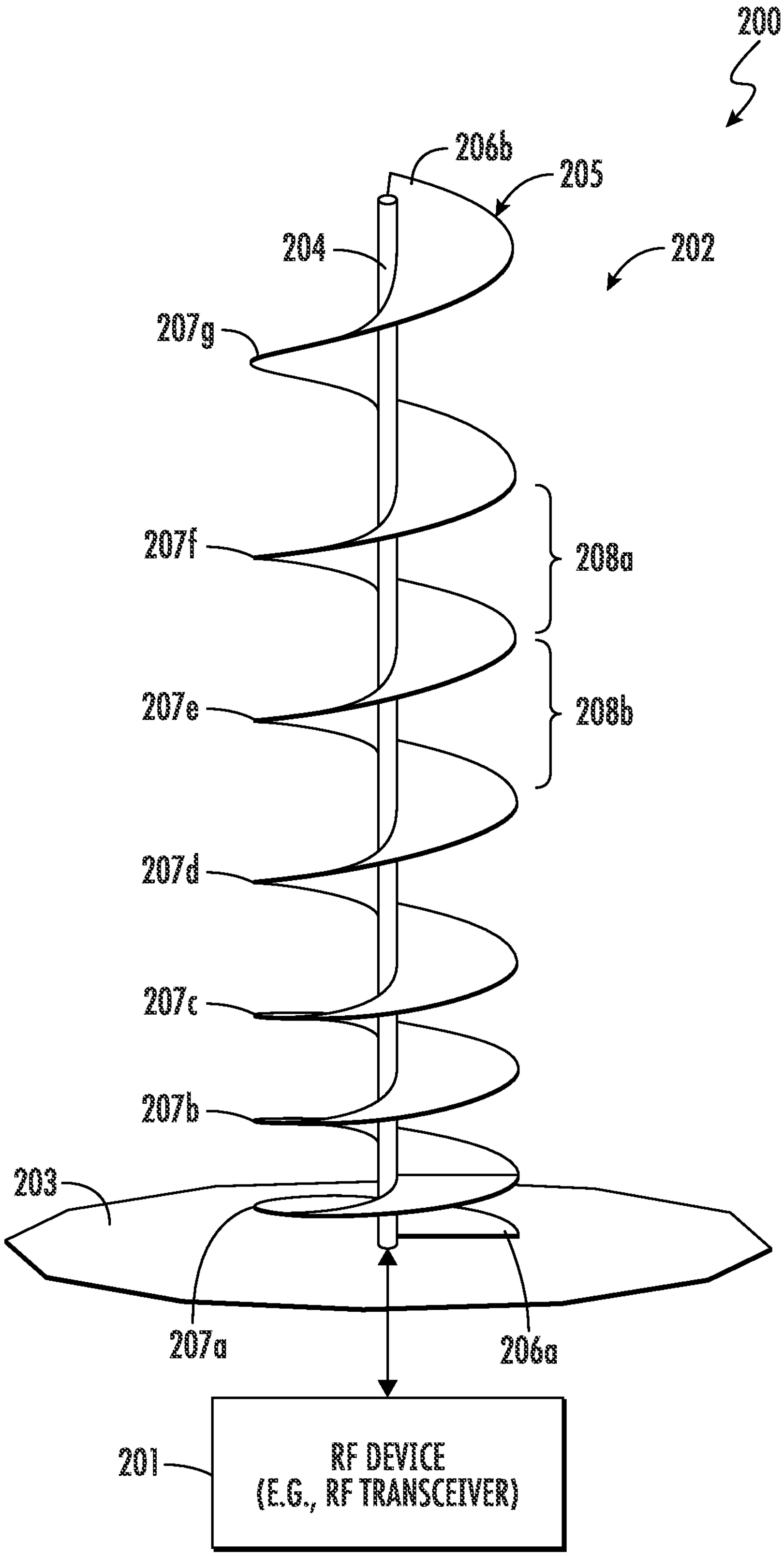
FIG. 1 is a schematic perspective view of a communications device, according to a first example embodiment of the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Figure 2:
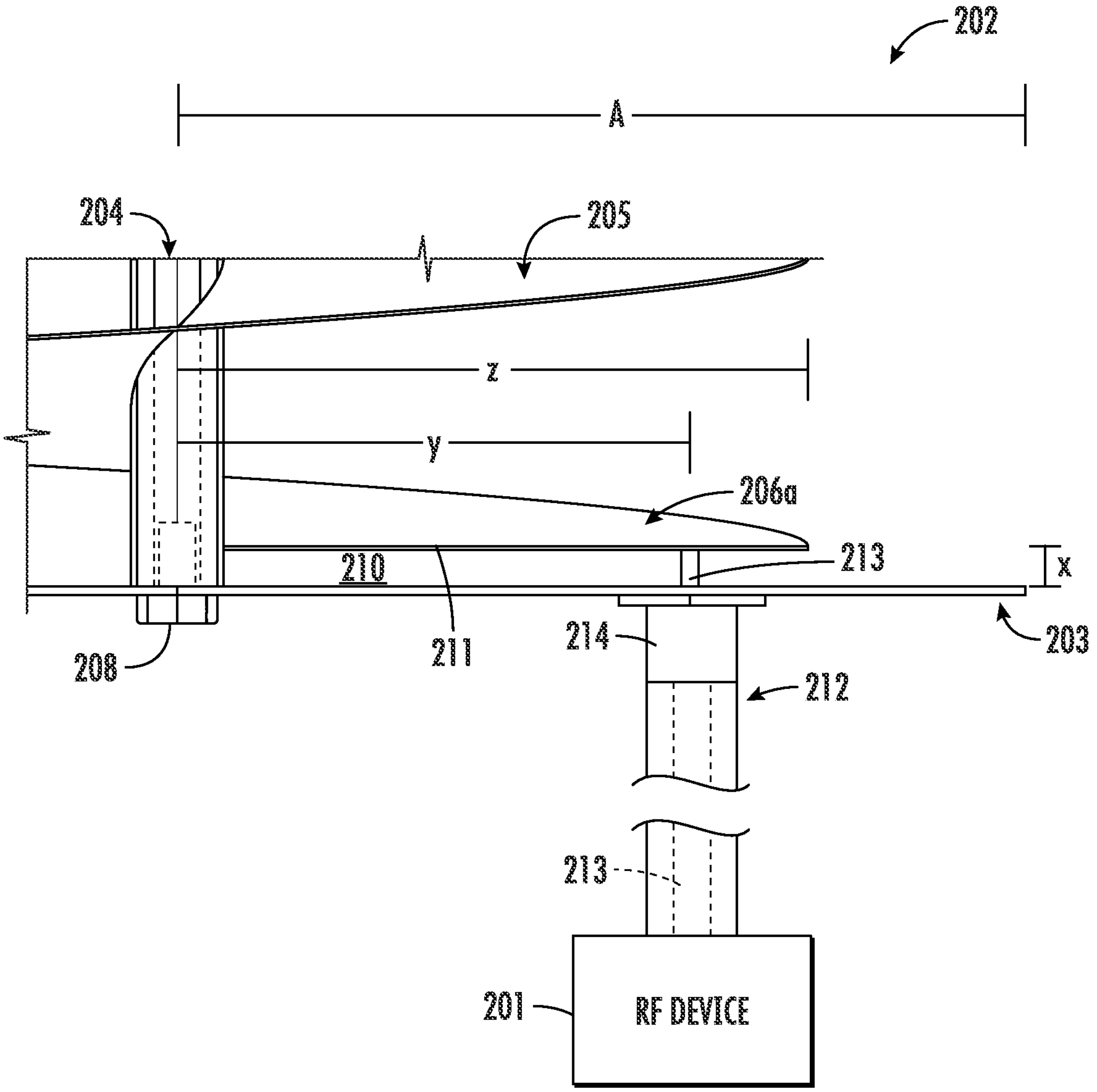
FIG. 2 is an enlarged schematic side view of the communications device of FIG. 1.

In light of the existing antennas, there is an unsolved issue for providing a small, compact antenna that includes both high bandwidth and high directionality. Referring to FIGS. 1-2, a communications device 200 according to the present disclosure is now described, which provides an approach to this issue. The communications device 200 illustratively includes an RF device 201 (e.g., RF transceiver, RF transmitter, or RF receiver), and an antenna 202 coupled to the RF device. For example, the communications device 200 may be deployed on-board a mobile platform, such as a vehicle or an aircraft. In some applications, the communications device 200 may comprise a LEO/MEO/high Earth orbit satellite communications device (i.e. either ground-to-space, space-to-ground, or space-to-space). In other applications, the communications device 200 may be deployed in a point-to-point terrestrial network.

The antenna 202 illustratively comprises a conductive ground plane 203. The conductive ground plane 203 is illustratively planar and circle-shaped, but may take one other shapes, such as a planar/curved rectangle-shape or a planar/curved oval-shape. Indeed, in some vehicular applications, the ground metallic body of a vehicle may serve as the conductive ground plane 203. In some embodiments, the conductive ground plane 203 comprises a peripheral section having non-planar corrugations, which may provide radiation pattern shaping. The conductive ground plane 203 may comprise one or more of aluminum, copper, silver, steel, and gold, for example. Indeed, any material of sufficient electrical conductivity can be used. Other antenna 202 backings may be substituted for the ground plane 203, such as closed end cylindrical cups or hollow cones.

The antenna 202 illustratively comprises an elongate support 204 extending from the conductive ground plane 203. The elongate support 204 is cylinder-shaped in this illustrative example. Nevertheless, in other embodiments, the elongate support 204 may comprise a rectangle-shaped, circular or oval-shaped cross section. Moreover, the elongate support 204 may be partially or entirely comprised of electrically conductive material. In other embodiments, the elongate support 204 may comprise entirely or partially a dielectric material. For example, in one embodiment, the elongate support 204 comprises a dielectric base elongate support, and an electrically conductive cover layer thereon (e.g. applied via sputtering or an adhesively backed conductive tape layer, such as copper tape). The elongate support 204 may even be absent in some embodiments, as for instance, the antenna 202 being formed from a twisted metal strip.

As perhaps best seen in FIG. 2, the elongate support 204 comprises a tubular structure with a hollow interior. Of course, in other embodiments, the elongate support 204 may comprise a solid rod. Also, the communications device 200 illustratively comprises a fastener 208 coupling the conductive ground plane 203 to the elongate support 204. In other embodiments, the elongate support 204 is alternatively welded to the conductive ground plane 203.

The antenna 202 illustratively comprises a helically wound conductive strip 205 carried by the elongate support 204. As will be appreciated, the helically wound conductive strip 205 may be categorized as a helical volute, helical blade, twist drill, an auger-shape, or an Archimedean screw.

In some embodiments, the helically wound conductive strip 205 comprises an electrically conductive ribbon wound about the elongate support 204. The helically wound conductive strip 205 comprises a proximal end 206*a* adjacent the conductive ground plane 203, and a distal end 206*b* opposing the proximal end and defining an end-fire point for a radiation pattern. The helically wound conductive strip 205 comprises a plurality of turns 207*a*-207*g* about the elongate support 204, and the spacing between adjacent turns is defined as a helical pitch. The turns 207*a*-207*g* define helical slots 208*a*-208*b* within a void area between the turns of the helically wound conductive strip 205.

In the illustrated embodiment, the helical winding pitch of the helically wound conductive strip 205 varies along the elongate support 204, but in other embodiments, the diameter may constant. There is a design tradeoff in this design feature: a constant helical pitch for the helically wound conductive strip 205 may be easier to design and fabricate while a variable winding pitch for the helically wound conductive strip 205 allows for increased directivity, increased gain, and reduced side lobes. Thus, a variable helical pitch for the helically wound conductive strip 205 may perform better than a constant helical pitch embodiment. In taller variable winding pitch embodiments, the optimum variable helical pitch may be in the range of 4°-28°, being 4° degrees at the ground plane end and 28° at the distal radiating end. The reason for this is that the velocity of a transmitted radio wave speeds up along the helically wound conductive strip 205 as the wave passes towards the distal radiating end. In receive mode, the radio wave slows as it approaches the conductive ground plane 203. Elongate antennas may operate in the Hansen Woodward wave velocity range, as described in the reference "A New Principle In Directional Antenna Design", W. W. Hansen, J. R. Woodward, Proceedings Of The Institute Of Radio Engineers, 1938, volume 26, issue 3 pp 343-345. An additional reference in this regard is: "Two-dimensional End Fire Array With Increased Gain and Side lobe Reduction", H. Ehrenspeck, W. Kearns, Wescon/57 conference record, volume 1, pp 217-229.

A constant helical pitch allows for the antenna 202 to have adjustable directivity and beamwidth by screwing and unscrewing distal sections of the antenna, for example, a field truncated antenna. For field truncated antenna 202, the helically wound conductive strip 205 must advance axially by a constant spacing s between turns of 0.2λ, where λ=the free space wavelengths per turn. An equation to calculate the constant winding pitch angle α to obtain the optimum s=0.2λ turns spacing is:

$$\alpha=\tan^{-1}(s/(\pi D))$$

where:

α=the winding pitch angle in degrees s=the constant spacing between turns in wavelengths λ, s=0.2λ

D=the helically wound conductive strip 205 diameter in wavelengths λ.

Also, the helical angle of the helically wound conductive strip 205 varies along the elongate support 204, but in other embodiments, the helical angle may be constant. Moreover, the helically wound conductive strip 205 has a constant diameter extending between the proximal end 206*a* and the distal end 206*b*. The ribbon thickness of the helically wound conductive strip 205 is constant along the elongate support 204, but may vary in other embodiments.

As perhaps best seen in FIG. 2, the proximal end 206*a* of the helically wound conductive strip 205 defines a gap 210 (i.e. a feed gap) with adjacent portions of the conductive ground plane 203. In particular, the proximal end 206*a* of the helically wound conductive strip 205 defines a longitudinal edge 211 extending radially from the elongate support 204 towards an outer radial end of the conductive ground plane 203.

The communications device 200 illustratively includes a coaxial cable 212 coupling the RF device 201 and the antenna 202. The coaxial cable 212 includes an inner conductor 213 (i.e. a feed pin), and an outer conductor 214 surrounding the inner conductor. The outer conductor 214 is coupled to the conductive ground plane 203. The inner conductor 213 extends through an aperture (i.e. a feed point) in the conductive ground plane 203 to be coupled to the proximal end 206*a* (i.e. the longitudinal edge 211) of the helically wound conductive strip 205. The inner conductor 213 may be soldered to the proximal end 206*a*, be clamped through a hole (not shown) in the helically wound conductive strip 205 using a threaded inner conductor 213 with nuts (not shown), or otherwise.

The operational characteristics of the communications device 200 are set by the physical dimensions of the gap 210. In particular, the input resistance of the communications device 200 is determined by x, the distance between the longitudinal edge 211 and the conductive ground plane 203, and y, the radial distance between the elongate support 204 and the inner conductor 213. A smaller value of x will bring the driving resistance to a lower value, and a higher value of x will provide a higher driving resistance. The tuned frequency is set by z, a radial distance between the elongate support 204 and an outer radial edge of the longitudinal edge 211. The back lobe of the antenna 202 is set by A, a radial distance between the elongate support 204 and an outer radial edge of the conductive ground plane 203. The conductive ground plane 203 illustratively has a width greater than a diameter of the helically wound conductive strip 205. Moreover, the antenna 202 has an operating frequency, and the helically wound conductive strip 205 has a diameter between 0.30 and 0.60 wavelengths at the operating frequency. The helically wound conductive strip 205 therefore has a circumference of 0.94 and 1.88 wavelengths of the operating frequency. In one embodiment, peak realized gain occurred at a helically wound conductive strip 205 diameter of 0.48 wavelengths.

In some embodiments, rather than the conductive ground plane 203 having the aperture feed point for the inner conductor 213, the conductive ground plane comprises a radial slot (i.e. a movable feed point). In these embodiments, the radial distance y may be adjusted by sliding the inner conductor 213 within the radial slot, which adjusts the driving reactance and driving resonance of the antenna 202.

Yet another aspect is directed to a method for making an antenna 202 for a communications device 200. The method includes coupling a helically wound conductive strip 205 around an elongate support 204 carried by a conductive ground plane 203. The method further includes coupling a coaxial cable feed point carried by the conductive ground plane 203 to a coaxial cable 212. The coaxial cable 212 includes an inner conductor 213 and an outer conductor 214 surrounding the inner conductor with the outer conductor to be coupled to the conductive ground plane 203 and the inner conductor to extend through the conductive ground plane and to be coupled to a proximal end of the helically wound conductive strip 205.

In another embodiment, the antenna 202 may be switchable between a retracted state (compact form) and an extended state (as depicted). In particular, the elongate support 204 may comprise a telescoping support, and the helically wound conductive strip 205 may retract into a flat retracted state, or may comprise a ribbon that can wind into the retracted state.

As will be appreciated, the antenna 202 provides for a volute helix or auger with specific provisions for feeding, impedance, wave velocity and the like. Filling the subtended antenna 202 with the volute results in a better performing antenna in slot mode. The volute may provide a substrate for surface waves providing increased directivity. Helpfully, the conductive ground plane 203 functions to cause a single beam in the radiation pattern.

Table 1 lists the parameters and performance of an example prototype of the antenna 202:

TABLE 1

| Parameter | Value | Comment |
|---|---|---|
| Antenna type | Directive end fire | |
| Antenna shape | Archimedean screw, auger, or helical volute | |
| Antenna construction | 3D printing with metal plating | |
| Helically wound conductive strip height | 13.8 inches | |
| Helically wound conductive strip number of turns | 7¼ | |
| Helically wound conductive strip winding pitch | Variable | Hansen-Woodward wave velocity taper |
| Helically wound conductive strip diameter | 3.440 inches | |
| Helically wound conductive strip thickness | 0.032 inches | |
| Elongate support diameter | 0.200 inches | |
| Gap width (feed notch height) | 0.100 inches | |
| Inner conductor location | 0.775 inches out from antenna center axis | Dimension y FIG. 2 |
| Ground plane diameter | 10 inches | Aluminum sheet |
| Helically wound conductive strip construction | Copper plated 3D printed plastic | |
| Peak realized Gain | 14 dBic | At a frequency of 1600 MHz |
| 3 dB realized gain bandwidth | 62% | 1185 MHz to 1924 MHz |
| Polarization | Right hand circular | |
| Polarization axial ratio | Under 1.7 dB from 1.2 to 2.0 GHz | |
| Driving resistance | 50 ohms nominal | |
| Voltage standing wave ratio (VSWR) | Under 2 to 1 from 1.24 to 4.7 GHz | |

In the following, a theory of antenna operation will now be described. Antennas may come in three forms: panel, slot and skeleton. The helically wound conductive strip 205 comprises a slot or panel variant of the prior art wire helix. The center space of a wire helix cannot carry electrical current obviously. Advantageously, the helically wound conductive strip 205 distributes electrically current uniformly or nearly so throughout the interior of the subtended space. A uniform current distribution is the condition for maximum directivity and gain from a given antenna space. Hence, the helically wound conductive strip 205 may provide increased directivity from the prior art axial mode wire helix by using space more effectively. Traveling wave current flows along the helically wound conductive strip 205 and creates circular polarization due the curling motion of the applied electrical current. Side lobe levels are a function of winding pitch and are less for a progressive winding pitch than for a constant winding pitch. A progressive winding pitch may produce more realized gain by matching the Hansen-Woodward relation for axial wave velocity. Constant winding pitch embodiments may however be useful for some needs, such as cut to length gain adjustment. Gain is optimized in constant winding pitch embodiments with a spacing between turns of 0.2 wavelengths. The elongate support 204 provides for increased mechanical strength. A larger diameter elongate support 204 requires a larger helically wound conductive strip 205, and a smaller diameter helically wound conductive strip requires a smaller helically wound conductive strip.

The gap 210 provides an electrical drive discontinuity between the helically wound conductive strip 205 and the conductive ground plane 203. The width of the gap 210 has a large effect of the driving impedance provided by the antenna 202 to the coaxial cable 212. This is because the longitudinal edge 211 of the helically wound conductive strip 205 has a transmission line and transmission line shorted stub relationship with the conductive ground plane 203. The driving impedance of the antenna 202 as provided to the coaxial cable 212 is adjustable by means of the gap 210 width in the z direction, the gap 210 depth in the X direction, and the inner conductor 213 distance radially outward from the antenna 202 center axis. These parameters usefully provide impedance adjustment with radiation pattern change. Thus, the helically wound conductive strip 205 mechanical parameters can be set for maximum gain without compromise for impedance sake.

The radiation and impedance bandwidth of the antenna 202 exceeds that of Yagi-Uda antennas. This is because of the antenna element is a continuous element that avoids the shapely tuned individual element-slots of the Yagi-Uda. The directivity of the antenna 202 may arise from a surface wave transmission line or lens effect in that electromagnetic fields radiated by each turn remain attached to or guided along the wound conductive strip 205 until the last turn is reached. At the last turn, the guided electromagnetic fields expand rapidly to synthesize a large aperture area at the antenna radiating end. A self-exciting lens may be formed.

The conductive ground plane 203 may be varied over a wide range of diameters, the main trade being back lobe levels. Structures other than a conductive plate may be substituted for the conductive ground plane 203. For example, an open circuited waveguide or cup ground plane may be used. Parasitic currents on the mouth of a cylindrical cup ground plane cause increased directivity. A conductive cone shaped ground plane may be used. Although there is an increase in antenna system size, a cone ground plane produces low back lobes and low side lobes in return. Resistive tapered planar ground planes can also reduce back lobes. Thus, many options are available for the conductive ground plane 203 for the antenna 202.

Figure 3A:
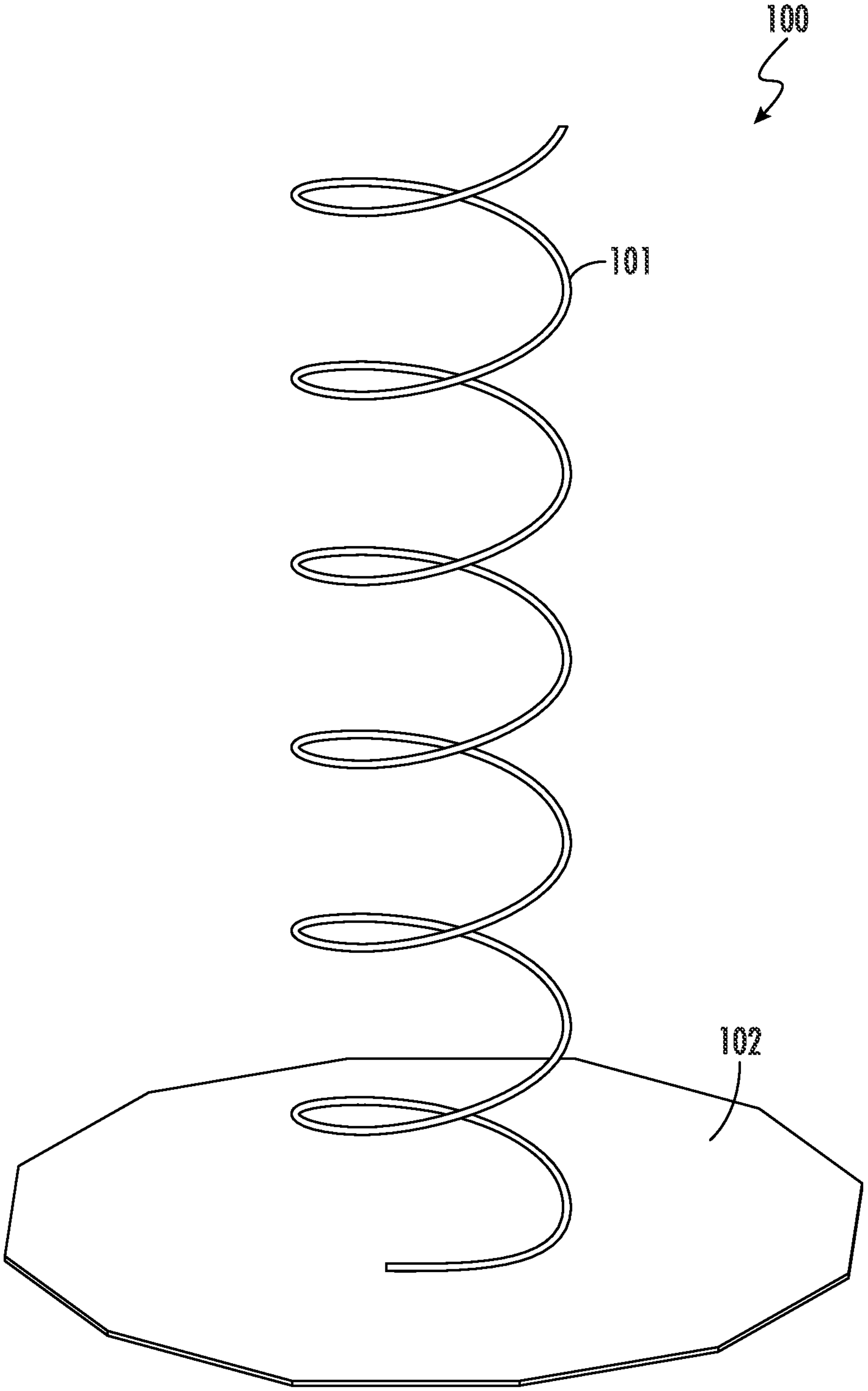
FIG. 3A PRIOR ART
FIG. 3A is a schematic perspective view of an antenna, according to the prior art.
Figure 3B:
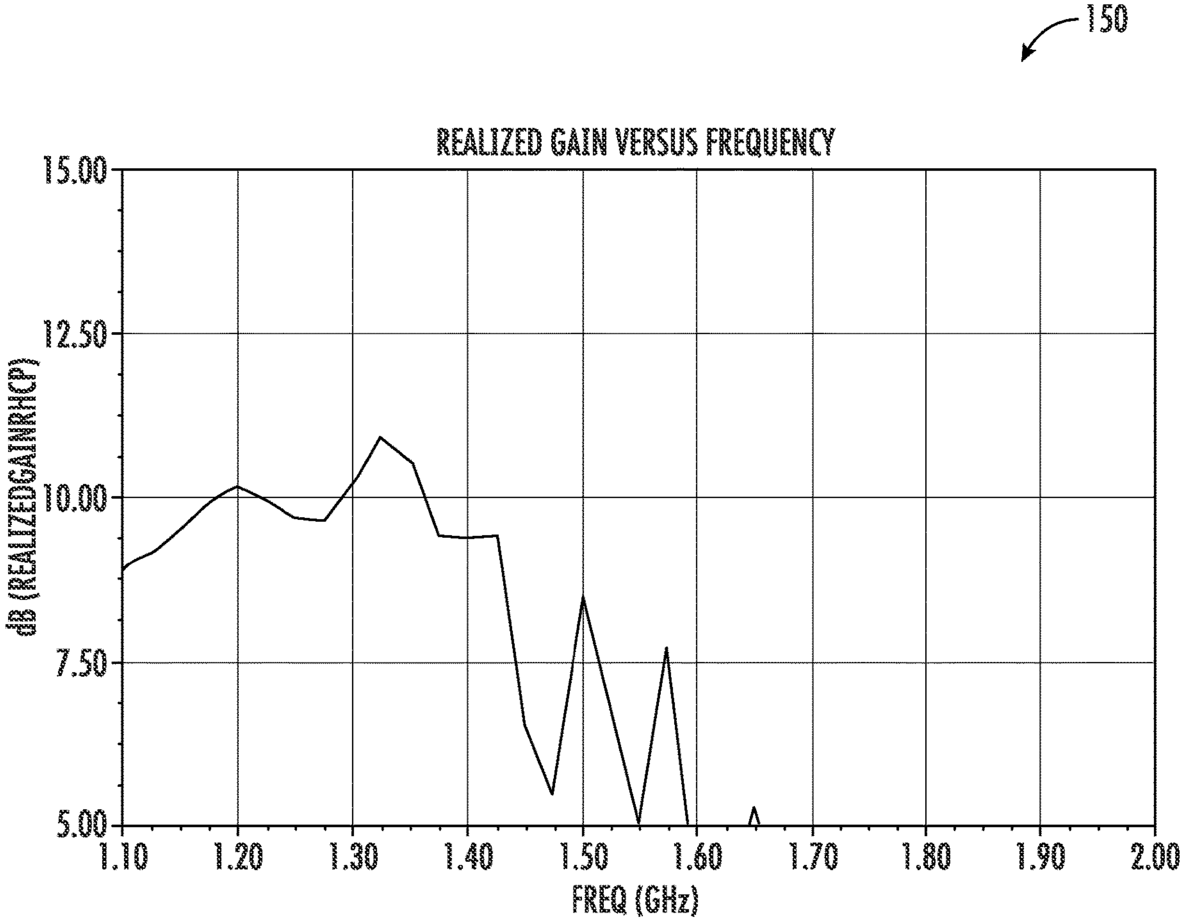
FIG. 3B PRIOR ART
FIG. 3B is a diagram of gain in the antenna of FIG. 3A.
Figure 4:
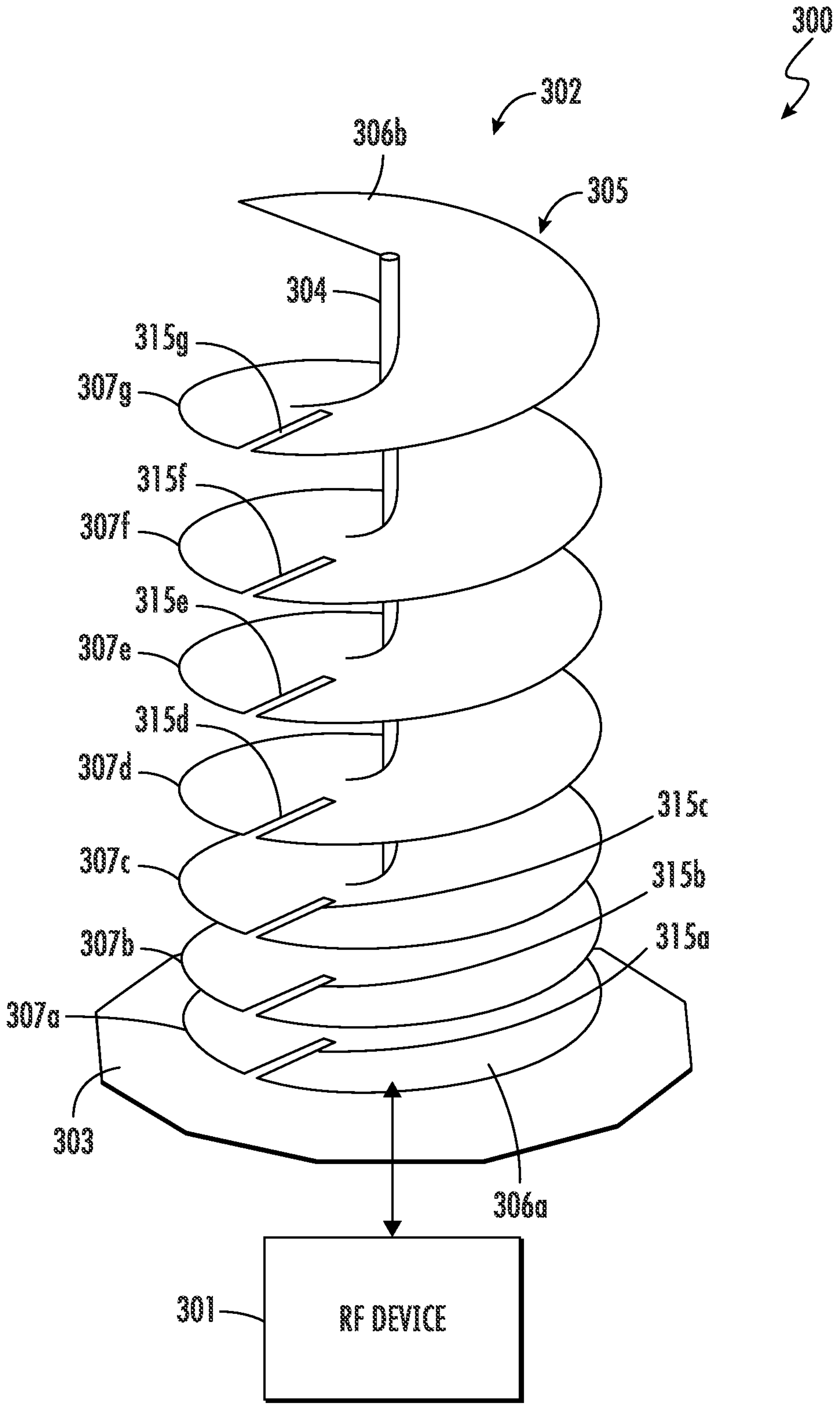
FIG. 4 is a schematic perspective view of a communications device, according to a second example embodiment of the present disclosure.

Referring now additionally to FIG. 4, another embodiment of the communications device 300 is now described. In this embodiment of the communications device 300, those elements already discussed above with respect to FIGS. 2-3 are incremented by 100 and most require no further discussion herein. This communications device 300 again illustratively includes a helically wound conductive strip 305 having a different helical pitch along the elongate support 304. More specifically, the helically wound conductive strip

305 has an increasing helical pitch in a direction extending from the conductive ground plane 303.

This embodiment differs from the previous embodiment in that this communications device 300 has each turn of the helically wound conductive strip 305 including a radial slot 315*a*-315*g* extending partially inward towards the elongate support 304. Each of the radial slots 315*a*-315*g* comprises a rectangle-shaped slot. The radial slots 315*a*-315*g* may cause phase shift in the curling currents that lets the different sectors of the volute add constructively in phase. Also, the radial slots 315*a*-315*g* provide design flexibility by allowing shorter length of the antenna 302, with a wider helically wound conductive strip 305. The radial slots 315*a*-315*g* may also provide for improved impedance matching. The outer crest or rim of a helically wound conductive strip 305 may have length of, for instance, 2 wavelengths per turn with the radial slots 315*a*-315*g* providing the 180 degrees, in total phase delay necessary for a constructive radiation. The radial slots 315*a*-315*g* may cause a piecewise sinusoidal current distribution on the helically wound conductive strip 305. Thus, a collinear or series fed array effect is obtained in each turn for increased communications device 300 directivity and shorter overall antenna length. The radial slots 315*a*-315*g* prevent the radiation pattern from breaking up into multiple lobes at greatly increased helically wound conductive strip 305 diameters.

It can be desirable to minimize antenna mass moment of inertia for space satellite application due to limits of reaction wheel load, for satellite stability, and to increase steering speed. The communications device 300 may advantageously reduce antenna moment of inertia and provide a shorter antenna for ease of launch.

Figure 5:
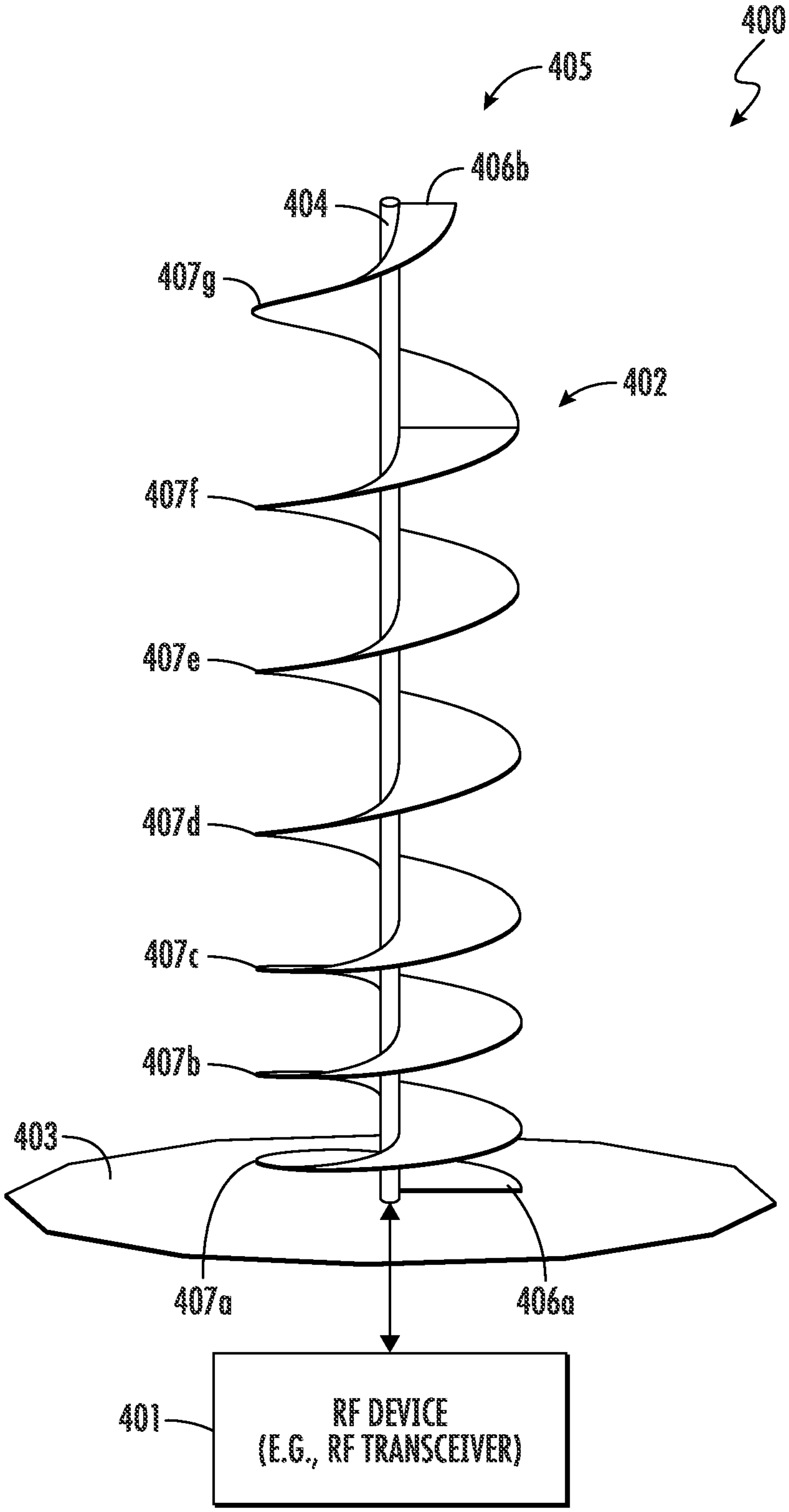
FIG. 5 is a schematic top plan view of a communications device, according to a third example embodiment of the present disclosure.

Referring now additionally to FIG. 5, another embodiment of the communications device 400 is now described. In this embodiment of the communications device 400, those elements already discussed above with respect to FIGS. 2-3 are incremented by 200 and most require no further discussion herein. This embodiment differs from the previous embodiment in that this communications device 400 illustratively includes a helically wound conductive strip 405 having a different diameter in a direction extending from the conductive ground plane 403. In particular, the helically wound conductive strip 405 has a decreasing diameter in a direction extending from the conductive ground plane 403.

That is, the helically wound conductive strip 405 has a partial conical-shape, which may provide for multi-octave bandwidth. In some applications where the antenna 402 is end fire in operation, the reduced diameter last turn 407*g* may help to facilitate wave release without a standing wave formation. In other embodiments, the varying diameter of the turns 407*a*-407*g* may be non-linear, providing other shapes, such as a dumbbell-shape to can obtain standing wave/reentrant operation.

Figure 6:
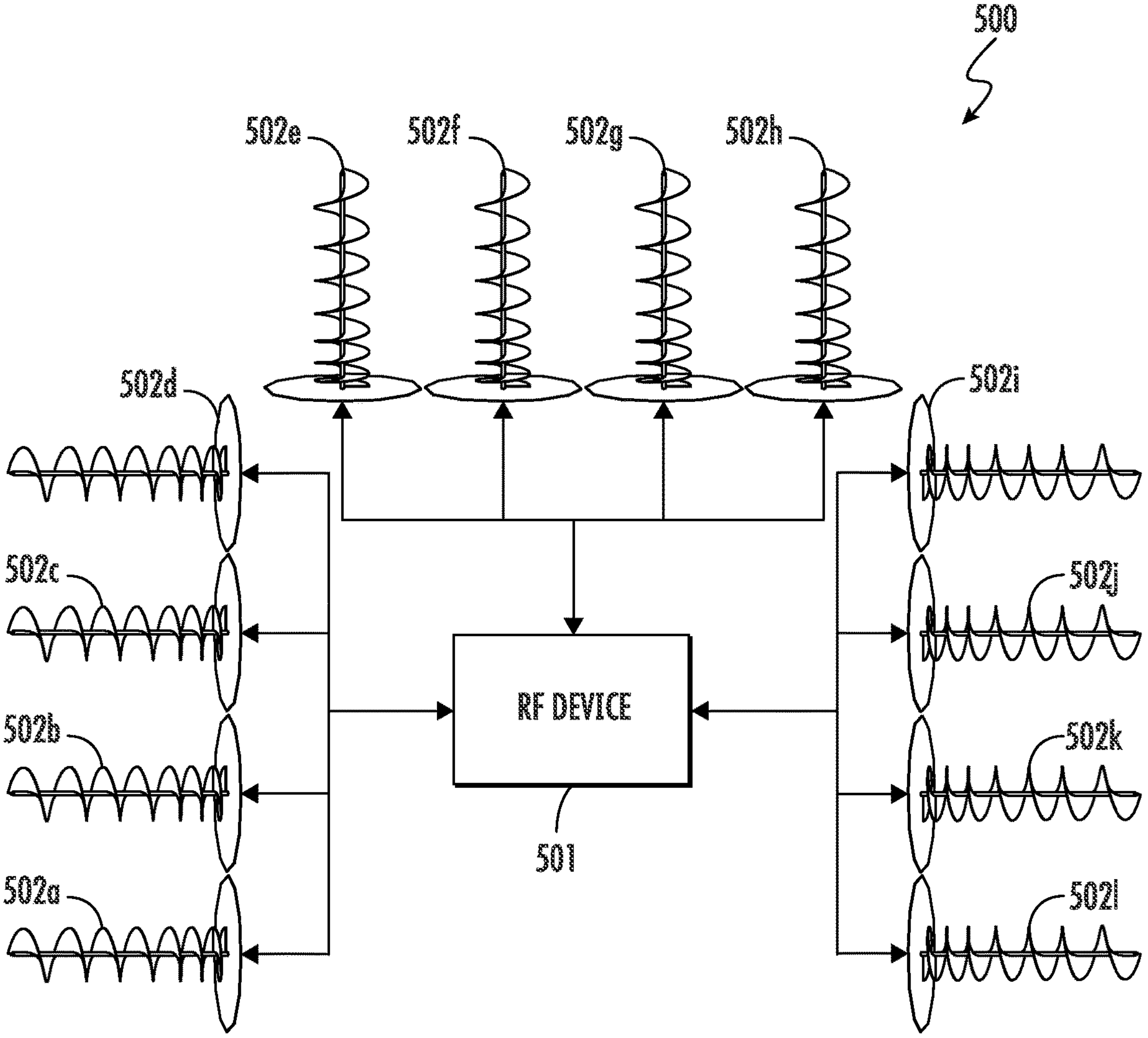
FIG. 6 is a schematic diagram of a communications device, according to a fourth example embodiment of the present disclosure.
Figure 7:
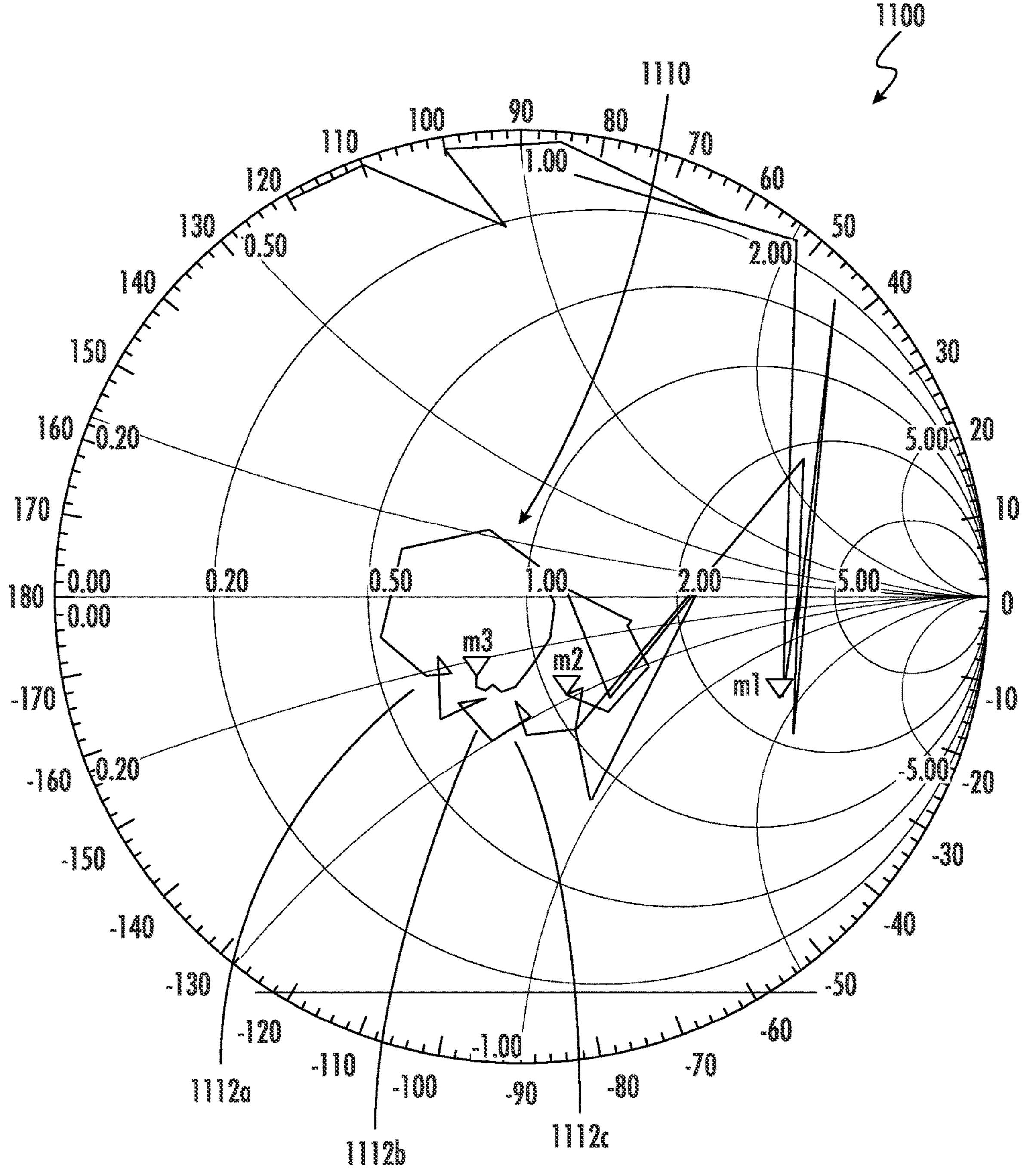
FIG. 7 is a diagram of a Smith chart of the communications device of FIG. 1.
Figure 8:
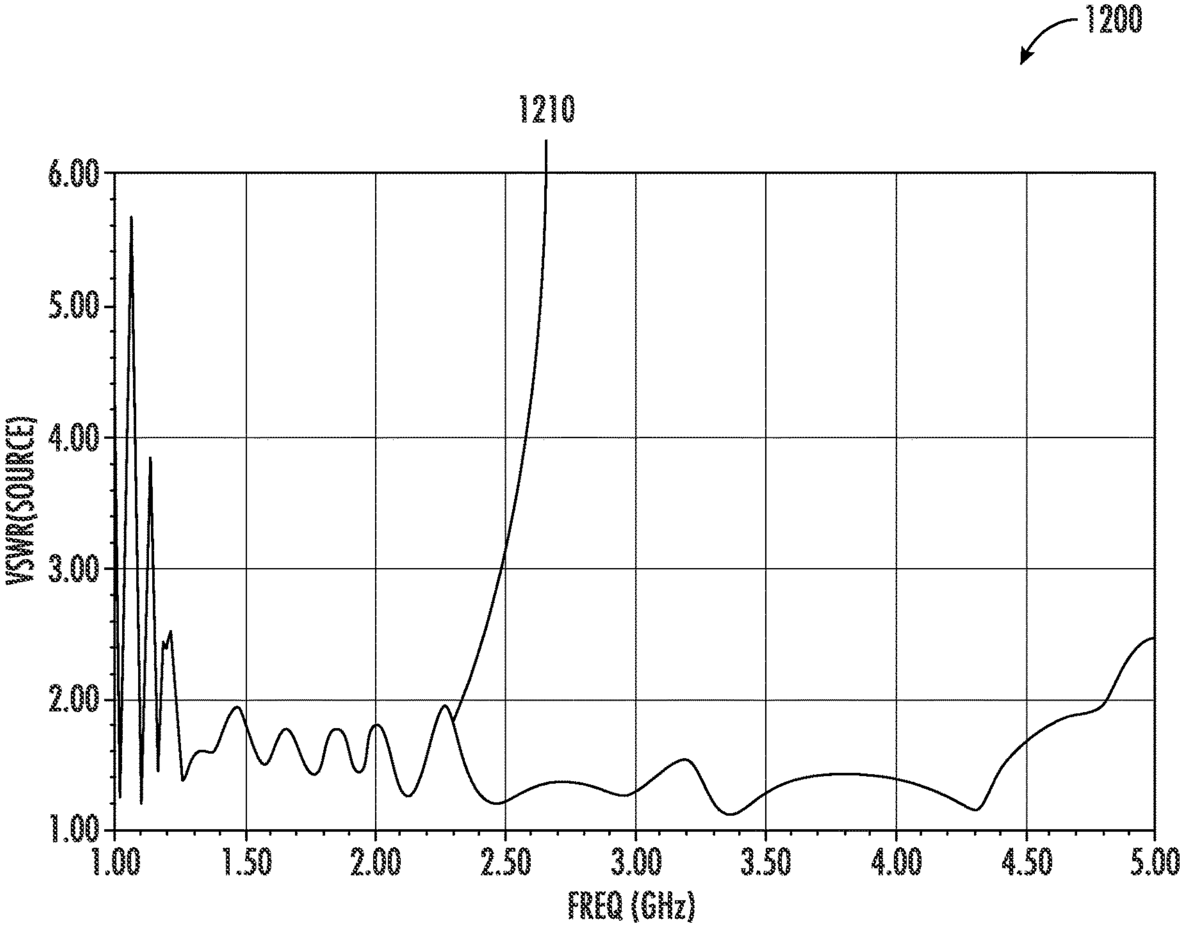
FIG. 8 is a diagram for voltage standing wave ratio (VSWR) in the communications device of FIG. 1.
Figure 9:
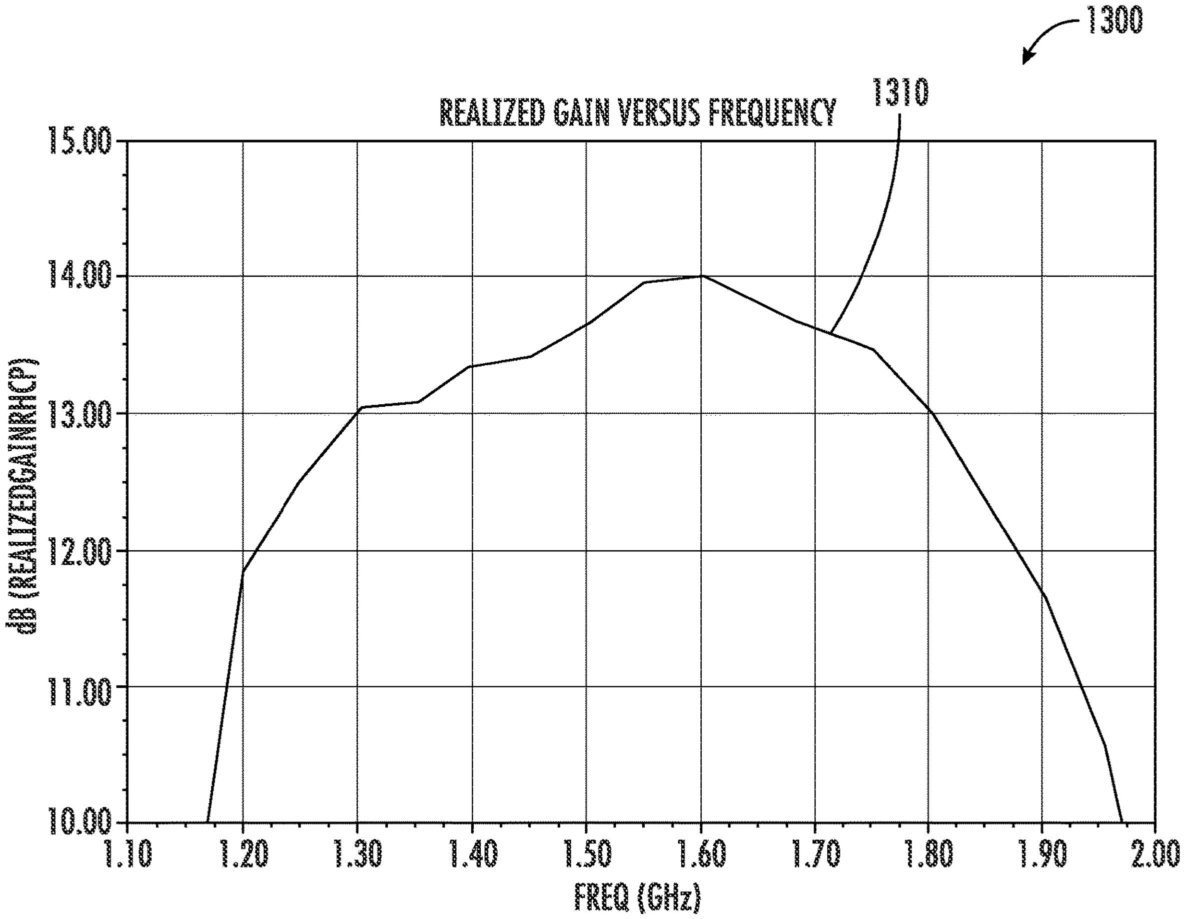
FIG. 9 is a diagram of gain in the communications device of FIG. 1.
Figure 10:
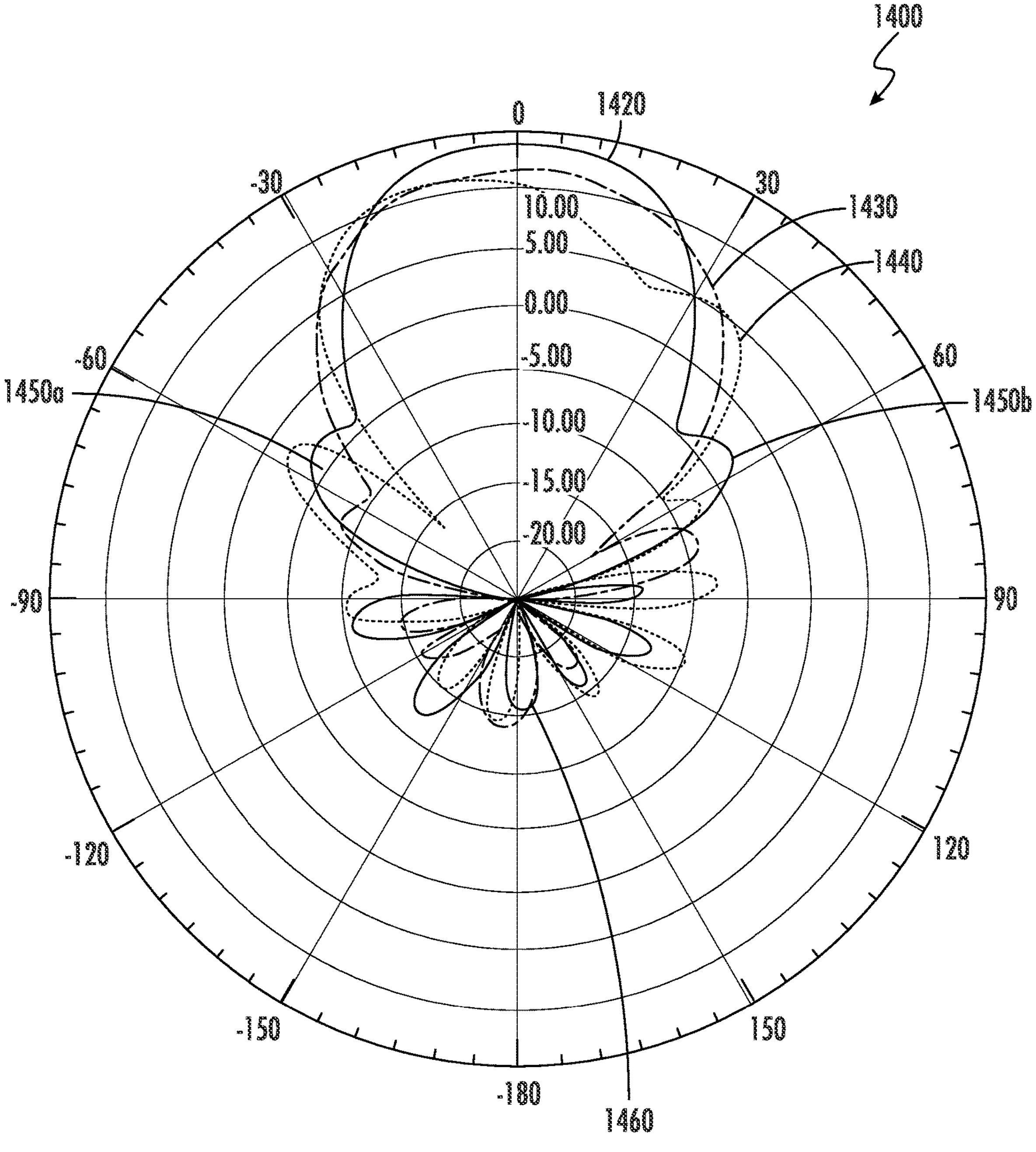
FIG. 10 is a diagram for a radiation pattern in the communications device of FIG. 1.

Referring now additionally to FIG. 6, another embodiment of the communications device 500 is now described. In this embodiment of the communications device 500, those elements already discussed above with respect to FIGS. 2-3 are incremented by 300 and most require no further discussion herein. This embodiment differs from the previous embodiment in that this communications device 500 illustratively includes a plurality of antennas 502*a*-502*l* arranged as an antenna array. Here, the RF device 501 is configured to process respective signals of the plurality of antennas 502*a*-502*l* to generate enhanced sensitivity and provide directional performance.

As will be appreciated, the antenna 202, 302, 402, 502*a*-502*l* provides for a flexible design. Nevertheless, there are design balances; in particular, increasing the elongate support 204, 304, 404 diameter requires a corresponding increase in the volute diameter of the helically wound conductive strip 205, 305, 405 to stay on the same frequency. Increasing the radial slot 315*a*-315*g* spacing requires feed tapping further from the elongate support 304. Moreover, a variable winding pitch may allow for a strong capture of the surface wave and a buildup of velocity along the helically wound conductive strip 205, 305, 405 for reflectionless wave release and maximum directivity. Second and third harmonic operations are possible by notching the volute, and this may provide an antenna of increased diameter and shorter length for the same gain.

Referring now additionally to FIGS. 7-10, the performance characteristics of the communications device 200, as compared to typical approaches, such as in the antenna 100 of the prior art, is now described. Diagram 1100 provides a vector impedance diagram or Smith chart for the antenna 202. Diagram 1200 shows a VSWR less than 2:1 from 1.24 GHz through 4.70 GHz. In other words, the antenna 202 performs well across a wide band of operation.

In diagram 1100, there are many small cusps 1112*a*-1112*c* in the impedance response 1110 corresponding to the succession of turns and the slightly offset resonances of the succession of turns has in the antenna 202. There are number of impedance matching controls in the antenna 202. The inner conductor 213 distance from the elongate support 204 adjusts the impedance locus left and right on the Smith Chart. In particular, a shorter distance between the inner conductor 213 and the elongate support 204 moves the impedance locus to the left, and a larger distance moves the impedance locus to the right. The inner conductor 213 diameter adjusts a series connected self-inductance of the inner conductor; a smaller diameter inner conductor adjusts the impedance locus clockwise on the Smith Chart; and a larger inner conductor diameter adjusts the impedance counterclockwise. The gap 210 height adjusts the characteristic impedance of a transmission line stub mode existing between the conductive ground plane 203 and the longitudinal edge 211 of the helically wound conductive strip 205. A smaller gap 210 moves the impedance locus towards about the 8 o'clock direction while a larger gap moves the impedance locus towards the 2 o'clock direction. A smaller gap 210 means less inner conductor 213 series inductance. The gap 210 also defines a distributed element or microstrip transmission line stub in parallel with the antenna 202.

The greater the gap 210 dimension, the closer the inner conductor 213 may need to be located towards the elongate support 204, and the narrower the gap, the further the inner conductor 213 may need to be located from the center support 204. The helically wound conductive strip 205 width, and therefore antenna 202 diameter, adjusts the frequency range that centers in the Smith Chart. A smaller antenna 202 diameter raises the frequency range that is centered in the Smith Chart, and a larger antenna diameter lowers the frequency range that is centered in the Smith Chart. In one instance, the elongate support 204 was removed and a low VSWR was maintained.

In diagram 1200, the trace 1210 shows the voltage standing wave ratio (VSWR) in a 50 ohm system. Usefully, the VSWR is under 2 to 1 over the range of 1.2 to 4.8 GHz, a VSWR bandwidth of 4 to 1. The antenna 202 may provide a good electrical load over this frequency region.

Diagram 1300 includes a trace 1310 showing the realized gain versus frequency for an embodiment of the antenna 202. Units are dBic or decibels with respect to an isotropic circularly polarized antenna. A useful 3 dB gain bandwidth of 1.63 to 1 may be provided.

Referring now again to FIG. 3B, diagram 150 and diagram 1300 provide realized gain in the prior art antenna 100 and the communications device 200, respectively. For the communications device 200, the realized gain is 14.0 dBi (i.e. providing twice the gain with the same length), and the gain profile is substantially flat across a broad operating frequency range (e.g., <3000 MHz). Moreover, the antenna 202 provides for a DC ground and allows for harmonic operation with a shorter length.

Rather, in diagram 150, the realized gain is jagged and inconsistent over the same frequency band. Also, the communications device 200 is structurally more rigid and sound and does not require a fiberglass form or cover, as with the antenna 100.

Diagram 1400 shows an elevation cut radiation pattern for the antenna 202. Helpfully, the radiation pattern is quite directional. The solid black trace 1420 is realized gain at the center of the antenna frequency passband $f_c$, for circular polarization, and in free space. The units are dBi, which is the realized gain relative an isotropic antenna. The pattern peak is along the antenna axis. The dash-dot trace 1430 was at a frequency 0.77 $f_c$. The dash-dash trace 1440 was at a frequency of 1.26 $f_c$. These traces 1430, 1440 and their respective frequencies represent the 3 dB gain passband edges. The side lobes 1450*a*-1450*b* relate to the $f_c$ frequency and are usefully 17 dB down from the main lobe. A prior art constant pitch axial mode helix would typically be −13 dB down so the present embodiment has reduced side lobes. The back lobes 1460 trade with ground plane 203 size and type. In summary, as compared to the antenna 100 of the prior art, the communications device 200 may provide more gain and bandwidth. Also, the communications device 200 is smaller than helix prior art antennas, such as the antenna 100.

Figure 11:
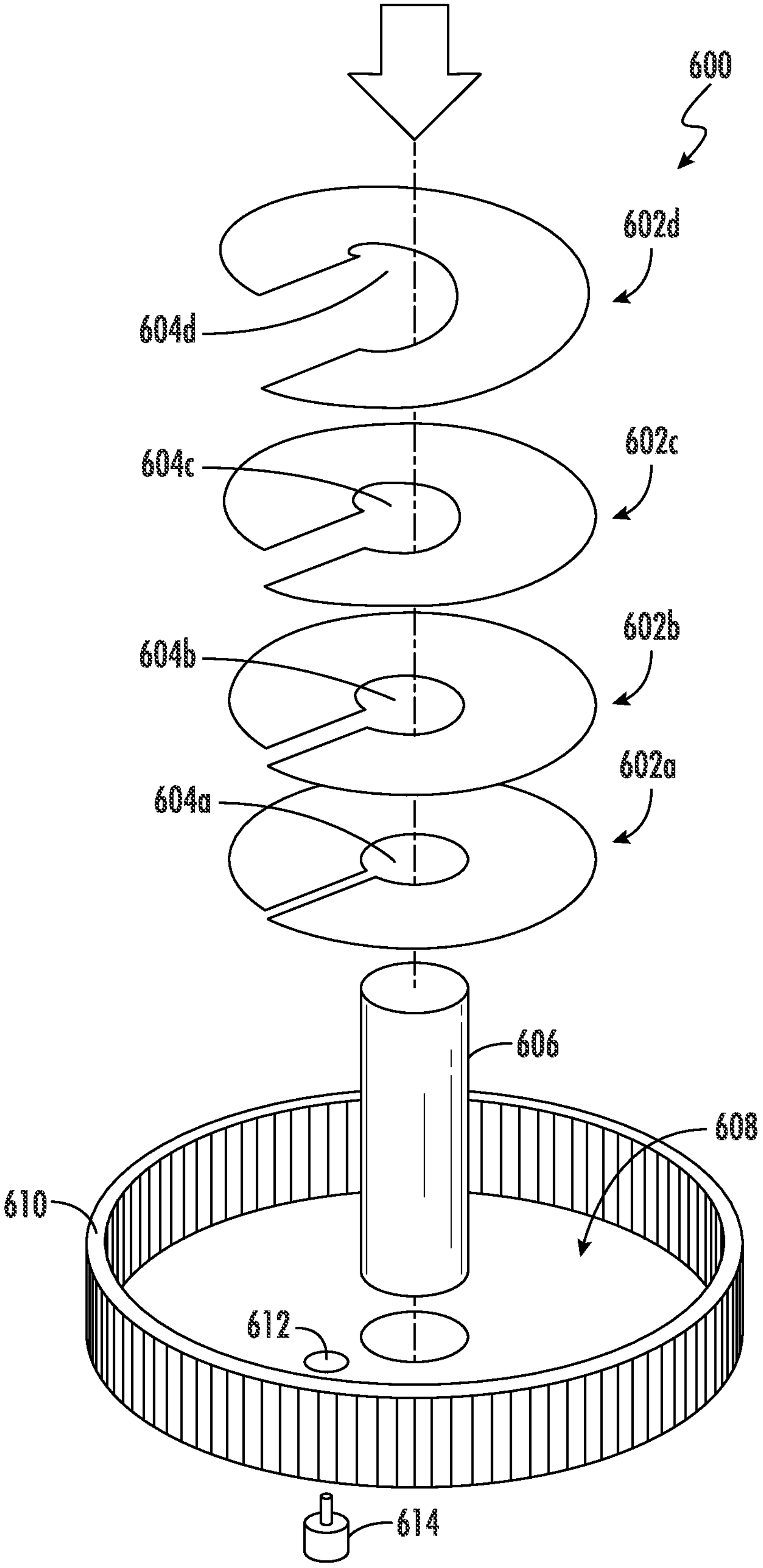
FIG. 11 is diagram showing a method of manufacture for the communications device of FIG. 1A.

Referring now to FIG. 11, a diagram 600 depicts a method of manufacture for the antenna 202 using basic tools and welding. In this method, the steps may comprise the following. Circular sheet metal flat washers are cut and bent into helical shape lock washers 602*a*-602*d* by bending. Each lock washer 602*a*-602*d* may comprise a full turn or a partial turn. Holes 604*a*-604*d* are formed in the circular sheet metal discs, which must be larger than the elongate support 606 diameter. Forming the helical lock washer 602*a*-602*d* reduces the size of the holes 604*a*-604*d*.

The lock washers 602*a*-602*d* have adjoining surfaces welded to one another to from a helical volute (not shown). The welded stack of lock washers 602*a*-602*d* is then placed over the elongate support 606. Last minute adjustments in winding pitch may be made. The stack of lock washers 602*a*-602*d* is then welded to the elongate support 606. The conductive ground plane 608 may then be welded from the bottom to the elongate support 606. The conductive ground plane 608 may include a rim 610 for the enhancement of directivity gain. The connector 614 then is placed into hole 612, welded or otherwise attached to the conductive ground plane 608, and the center pin is welded to the edge of lock washer 602*a*.

Figure 12:
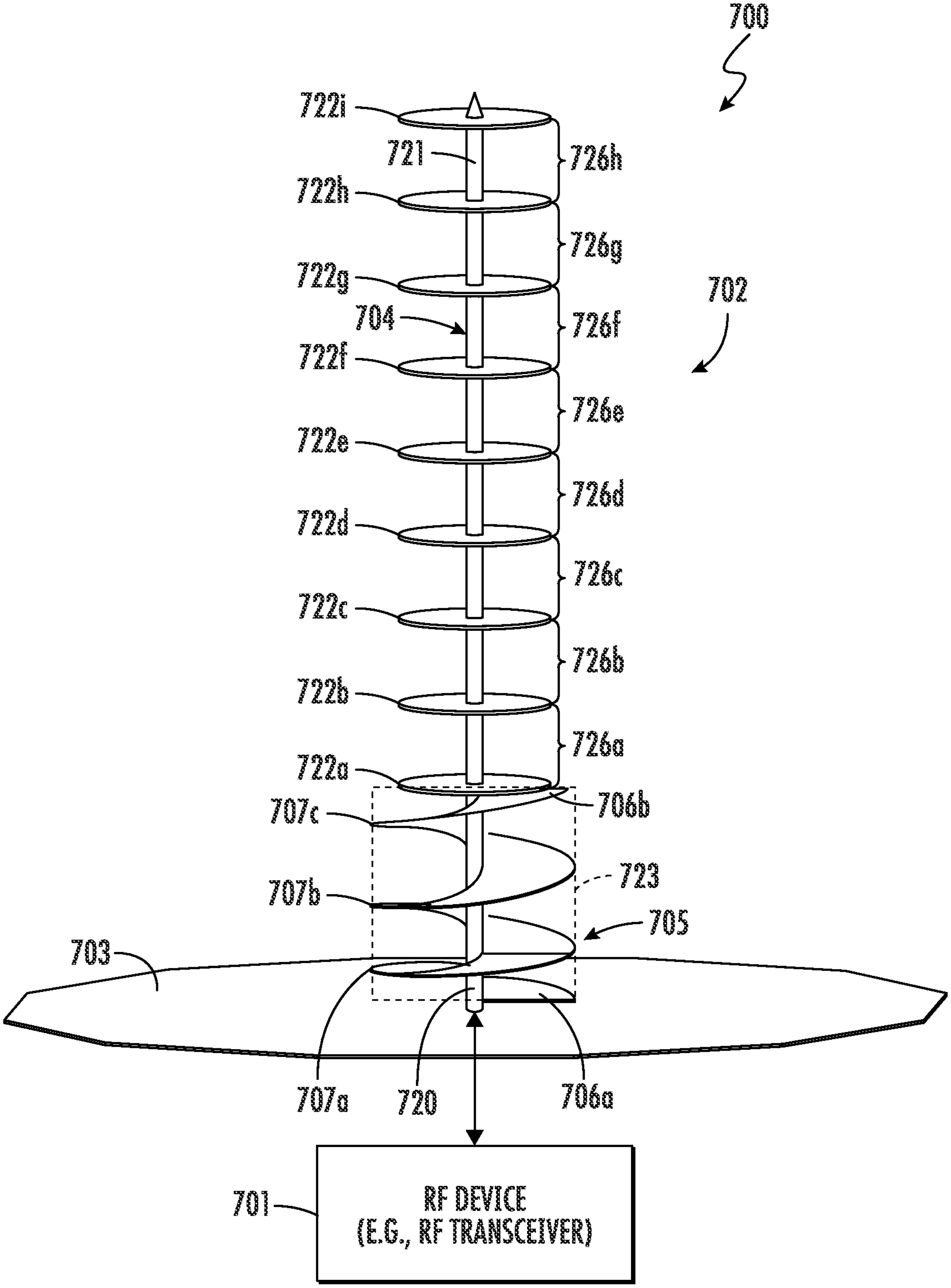
FIG. 12 is a schematic perspective view of a communications device, according to a fifth example embodiment of the present disclosure.
Figure 13:
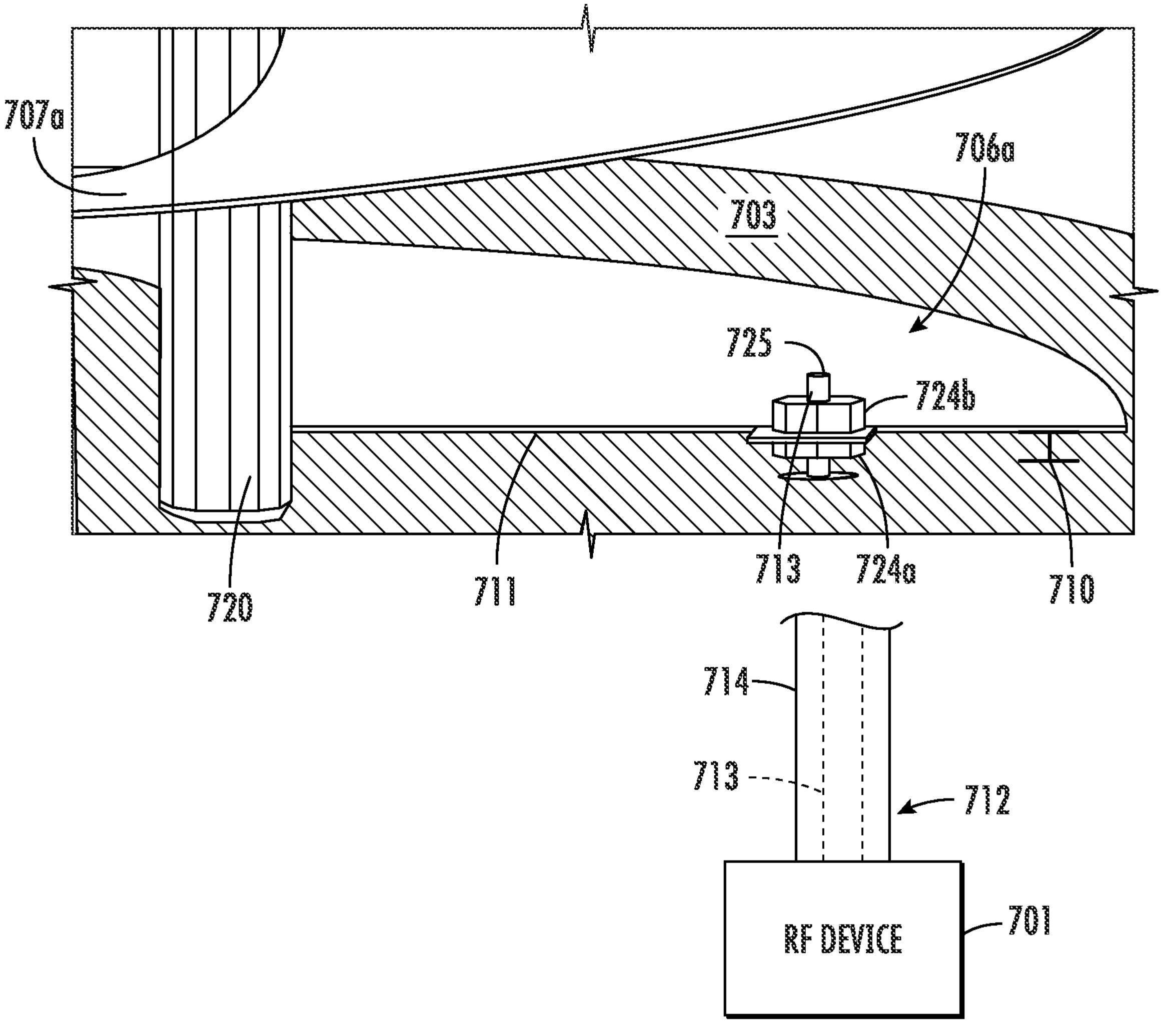
FIG. 13 is an enlarged schematic side view of the communications device of FIG. 12.

Referring now additionally to FIGS. 12-13, another embodiment of the communications device 700 is now described. In this embodiment of the communications device 700, those elements already discussed above with respect to FIGS. 2-3 are incremented by 500 and most require no further discussion herein. It should be appreciated that any of the features from the above embodiments of the communications device 200, 300, 400, 500 may be included in the communications device 700.

The communications device 700 includes an RF device 701, and an antenna 702 coupled to the RF device. The antenna 702 includes a conductive ground plane 703, illustratively a flat circle-shaped disc. In other embodiments, the conductive ground plane 703 may comprise a cone-shaped structure or a cylinder-shaped structure (See, e.g. FIG. 14).

The antenna 702 includes an elongate support 704 having a proximal end 720 extending from the conductive ground plane 703, and a distal end 721 opposite the proximal end. The elongate support 704 may comprise a conductive material, a dielectric material, or a combination of conductive and dielectric materials (e.g. conductive material plated on top of the dielectric material). The antenna 702 includes a helically wound conductive strip 705 carried by the proximal end 720 of the elongate support 704.

The antenna 702 includes a plurality of spaced apart conductive elements 722*a*-722*i* carried by the distal end 721 of the elongate support 704 to define an RF lens for the helically wound conductive strip 705. The plurality of spaced apart conductive elements 722*a*-722*i* is aligned with the helically wound conductive strip 705, but in other embodiments, the arrangement may be offset. Each of the plurality of spaced apart conductive elements 722*a*-722*i* illustratively includes a flat circle-shaped conductive element. In other embodiments, each of the plurality of spaced apart conductive elements 722*a*-722*i* may each have polygonal shapes, such as being square-shaped or rectangle-shaped.

The width dimensions of the communications device 700 taper inwardly moving from the conductive ground plane 703 to the distal end 721 of the elongate support 704. More specifically, the conductive ground plane 703 has a width greater than a diameter of the helically wound conductive strip 705. The helically wound conductive strip 705 defines an imaginary cylinder 723 having a diameter greater than a diameter of each of the plurality of spaced apart conductive elements 722*a*-722*i*.

The communications device 700 illustratively includes a coaxial cable 712 coupling the RF device 701 and the antenna 702. The coaxial cable 712 includes an inner conductor 713, and an outer conductor 714 surrounding the inner conductor. The outer conductor 714 is coupled to the conductive ground plane 703.

As perhaps best seen in FIG. 13, the inner conductor 713 illustratively extends through the conductive ground plane 703 and is coupled to a proximal end of the helically wound conductive strip 705. In particular, the inner conductor 713 is coupled to a laterally extending tab from a longitudinal edge 711 of the helically wound conductive strip 705. Also, the coupling is via a pair of nuts 724*a*-724*b*, and a threaded stud 725 extending though the conductive ground plane 703 and the pair of nuts. The threaded stud 725 threadingly engages the pair of nuts 724*a*-724*b* and receives the inner conductor 713. Also, the proximal end (i.e. the longitudinal edge 711) of the helically wound conductive strip 705 defines a gap 710 with adjacent portions of the conductive ground plane 703. Of course, in other embodiments, the communications device 700 may comprise a different type feed structure.

As will be appreciated, the number of the plurality of spaced apart conductive elements 722*a*-722*i* is illustratively nine, but this number may be increased to increase directivity of the communications device 700. The antenna 702 has an operating frequency, and for example, each of the plurality of spaced apart conductive elements 722*a*-722*i* may have a circumference between 0.9 and 1.1 wavelengths of the operating frequency. In one advantageous embodiment, each of the plurality of spaced apart conductive elements 722*a*-722*i* has a circumference of 1.04 wavelengths (diameter of 0.33 wavelengths) of the operating frequency.

In embodiments where the elongate support 704 comprises a dielectric material, the plurality of spaced apart conductive elements 722*a*-722*i* may be electrically uncoupled or isolated (i.e. electrically floating) with each other and to the helically wound conductive strip 705. In some embodiments, the plurality of spaced apart conductive elements 722*a*-722*i* may be electrically coupled to each other and additionally or alternatively coupled to the distal end of the helically wound conductive strip 705.

Adjacent spaced apart conductive elements 722*a*-722*i* may have a spacing between 0.1 and 0.3 wavelengths of the operating frequency. In one advantageous embodiment, the plurality of spaced apart conductive elements 722*a*-722*i* has a spacing of 0.2 wavelengths of the operating frequency. In the illustrated embodiment, the plurality of spaced apart conductive elements 722*a*-722*i* has a uniform and identical spacing throughout.

In other embodiments, the plurality of spaced apart conductive elements 722*a*-722*i* may have a varying spacing. In particular, the plurality of spaced apart conductive elements 722*a*-722*i* may have a spacing that increases as the conductive elements extend towards the distal end 721 of the elongate support 704. In these embodiments, the directivity of the communications device 700 may be increased.

The imaginary cylinder 723 of the helically wound conductive strip 705 may have a diameter between 0.3 and 0.6 wavelengths of the operating frequency. In one advantageous embodiment, the imaginary cylinder 723 of the helically wound conductive strip 705 has a diameter of 0.47 wavelengths of the operating frequency.

Also, the helically wound conductive strip 705 illustratively has a helical pitch identical to the spacing of the plurality of spaced apart conductive elements 722*a*-722*i*. Nonetheless, as discussed with respect to the other embodiments of the communications device 200, 300, 400, 500 above, the helical pitch may vary.

A theory of operation for the communications device 700 of FIG. 12 will now be described. The helically wound conductive strip 705 functions as a wave source or feed for an artificial lens formed by the plurality of spaced apart conductive elements 722*a*-722*i*. The reason for combining the helically wound conductive strip 705 with the plurality of spaced apart conductive elements 722*a*-722*i* is that the helically wound conductive strip provides broad impedance bandwidth as a wave transducer, for example, in the conversion of electric currents into fields than does a circular disc element as a wave feed. Conversely a stack of plurality of spaced apart conductive elements 722*a*-722*i* provides more directivity for length than does the helically wound conductive strip 705 alone. The communications device 700 of FIG. 12 provides both broad impedance bandwidth with high directivity and gain for antenna length. While a single circular metal disc positioned over a ground plane may constitute a microstrip patch antenna, the impedance bandwidth of such antenna is limited due to the small electrical size of the edge slot and the transmission line resonance that exists on the underside of the patch with respect to the ground plane. In antennas, it may be helpful to optimize for multiple bandwidths: impedance bandwidth, pattern bandwidth, and polarization bandwidth, etc.

Furthermore, as seen in FIG. 12, high impedance cavity spaces 726*a*-726*h* exist between the plurality of spaced apart conductive elements 722*a*-722*i*; and these cavity spaces provide: a high impedance corrugated surface at their periphery, a lensing effect for the attachment, and a conveyance of surface waves occurs axially along the plurality of spaced apart conductive elements. Waves attach to and convey along high impedance surfaces; and waves will be repulsed or reflected from low impedance surfaces, such as a metal sheets. At the distal end of the antenna 702, the E and H fields of the captured surface wave expands radially away from the axis of the antenna 702. A large disc shaped area of fields akin to an aperture is thus synthesized at the distal end of the antenna 702. The distal end of the antenna 702 is approximately the phase center or spatial centroid of radiation.

Realized gain and directivity grow at nearly 3 dB for length doubling of length along the antenna 702. Spacing between the distal end 706*b* of the helically wound conductive strip 705 and the proximal end of the plurality of spaced apart conductive elements 722*a*-722*i* is preferentially small so that the adjacent high impedance disc cavity space 726*a* can capture the wave emitted by the helically wound conductive strip. In practice, it may be preferential to fabricate the helically wound conductive strip 705 and the assembly of plurality of spaced apart conductive elements 722*a*-722*i* separately and then screw them together. A gap of 0.05 wavelengths between the distal end 706*b* of the helically wound conductive strip 705 and the proximal end of the assembly of plurality of spaced apart conductive elements 722*a*-722*i* has not impacted operation of the antenna 702.

Another aspect is directed to an antenna device 702 for an RF device 701. The antenna device comprises a conductive ground plane 703, an elongate support 704 extending from the conductive ground plane, and a helically wound conductive strip 705 carried by a proximal end 720 of the elongate support. The antenna further includes a plurality of spaced apart conductive elements 722*a*-722*i* carried by a distal end 721 of the elongate support 704 to define an RF lens for the helically wound conductive strip 705.

Yet another aspect is directed to a method for making an antenna 702 for a communications device 700. The method comprises coupling a helically wound conductive strip 705 around a proximal end 720 of an elongate support 704 carried by a conductive ground plane 703. The method further comprises coupling a plurality of spaced apart conductive 722*a*-722*i* elements to a distal end 721 of the elongate support 704 to define an RF lens for the helically wound conductive strip 705.

Figure 14:
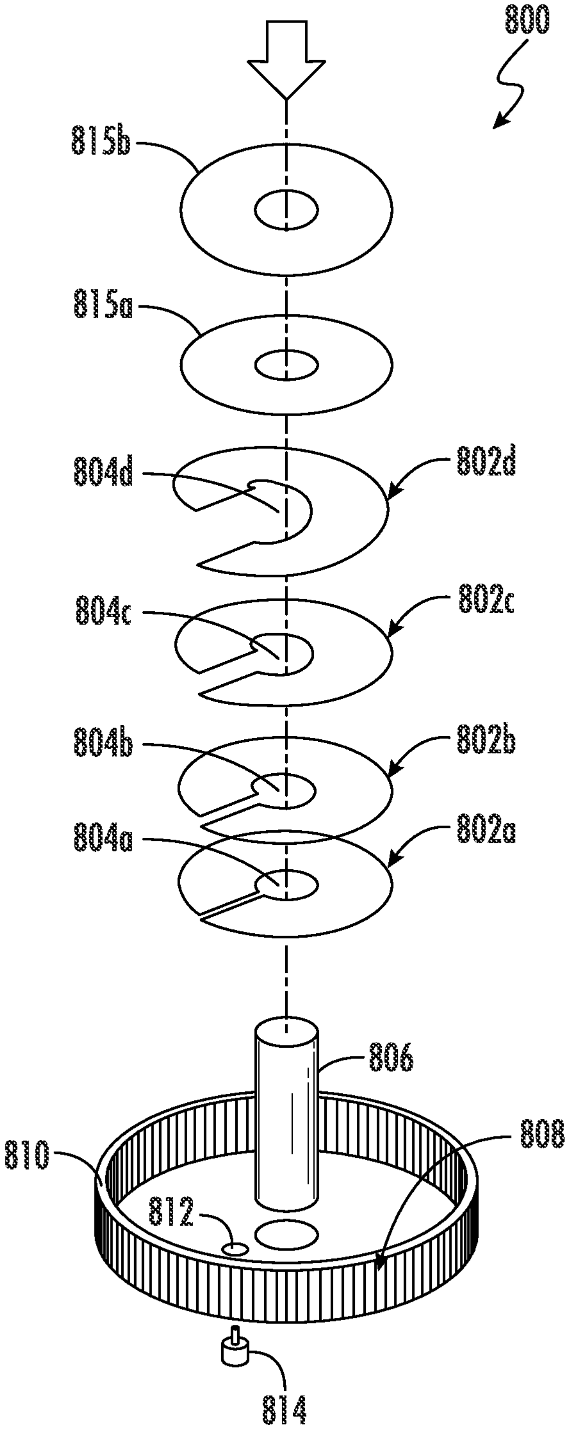
FIG. 14 is diagram showing a method of manufacture for the communications device of FIG. 12.

Referring now to FIG. 14, a diagram 800 depicts a method of manufacture for the antenna 702 using basic tools and welding. In this method, the steps may comprise the following. Circular sheet metal flat washers are cut and bent into helical shape lock washers 802*a*-802*d* by bending. Each lock washer 802*a*-802*d* may comprise a full turn or a partial turn. Holes 804*a*-804*d* are formed in the circular sheet metal discs, which must be larger than the elongate support 806 diameter. Forming the lock washers 802*a*-802*d* reduces the size of the hole 804*a*-804*d*.

The lock washers 802*a*-802*d* have adjoining surfaces welded to one another to from a helical volute (not shown). The welded stack of lock washers 802*a*-802*d* is then placed over the elongate support 806. Last minute adjustments in winding pitch may be made. The stack of lock washers 802*a*-802*d* is then welded to the elongate support 806. A plurality of rings 815*a*-815*b* is positioned on top of the stack of lock washers 802*a*-802*d* on the elongate support 806 to define the RF lens, and they are then welded thereto.

The conductive ground plane 808 may then be welded from the bottom to the elongate support 806. The conductive ground plane 808 may include a rim 810 for the enhancement of directivity gain. The connector 814 then is placed into a hole 812, welded or otherwise attached to the conductive ground plane 808, and the center pin is welded to the edge of lock washer 802*a*.

Figure 15:
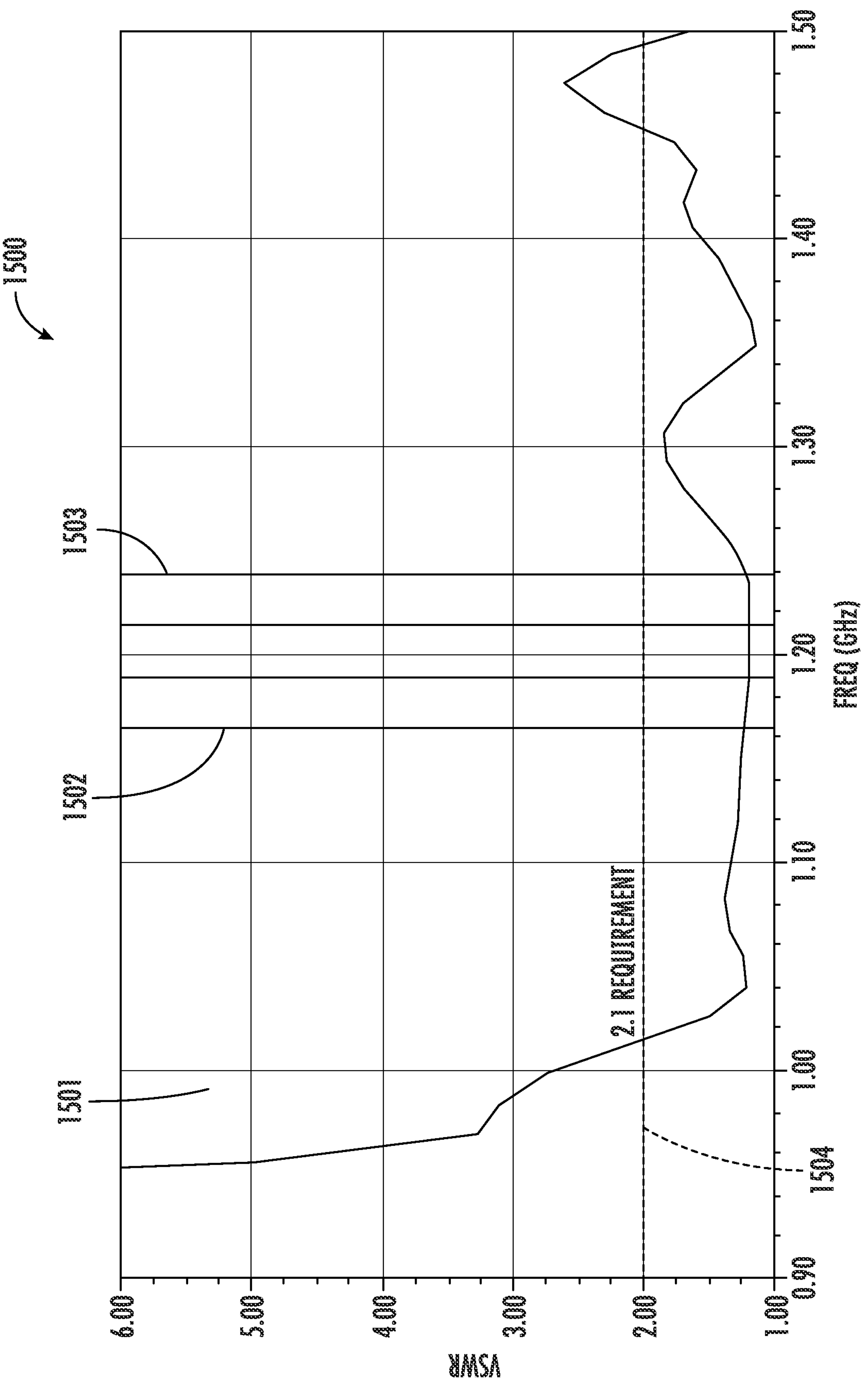
FIG. 15 is a diagram of voltage standing wave ratio in the antenna of FIG. 12.
Figure 16:
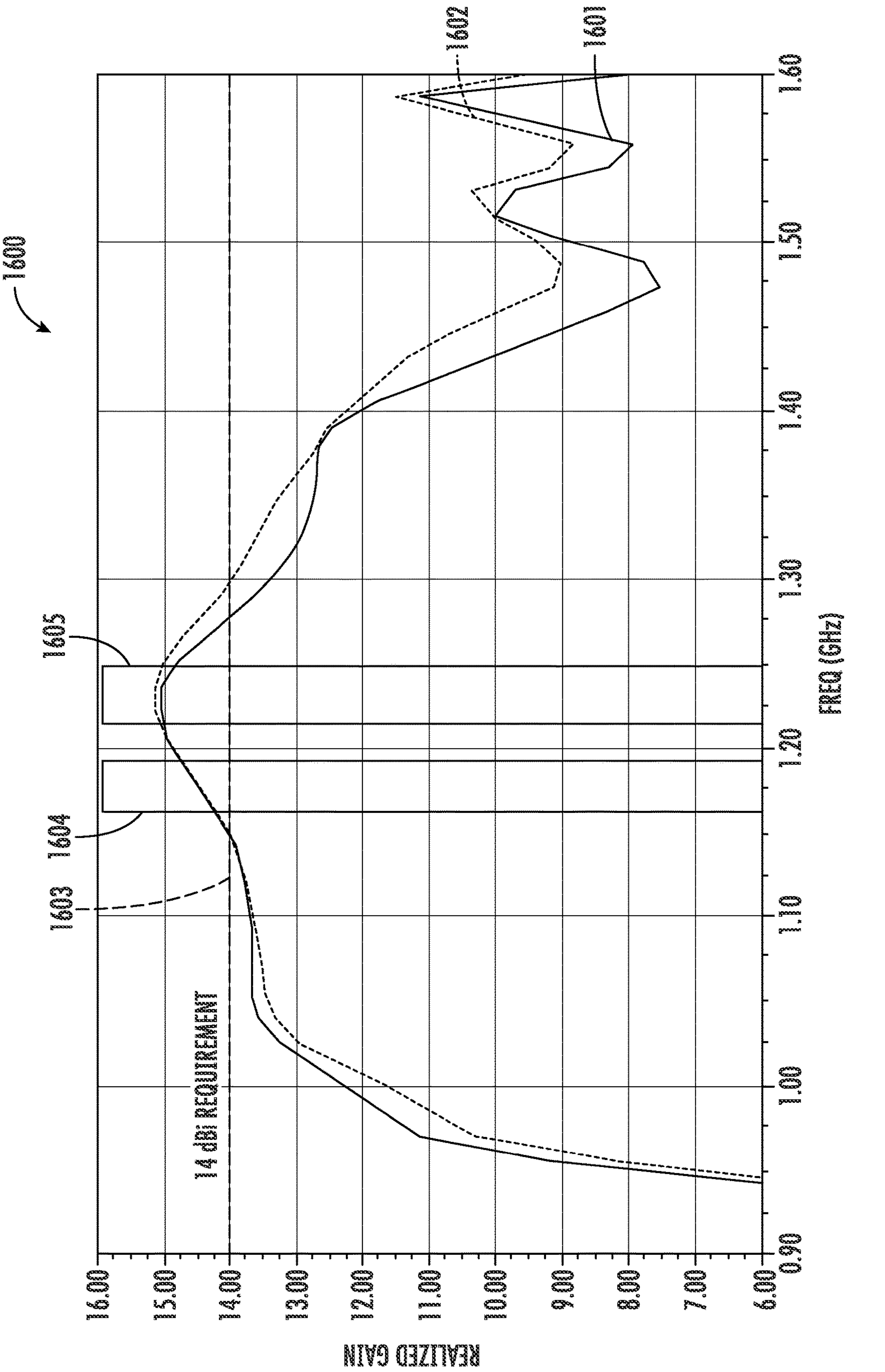
FIG. 16 is a diagram of gain standing wave ratio in the antenna of FIG. 12.
Figure 17:
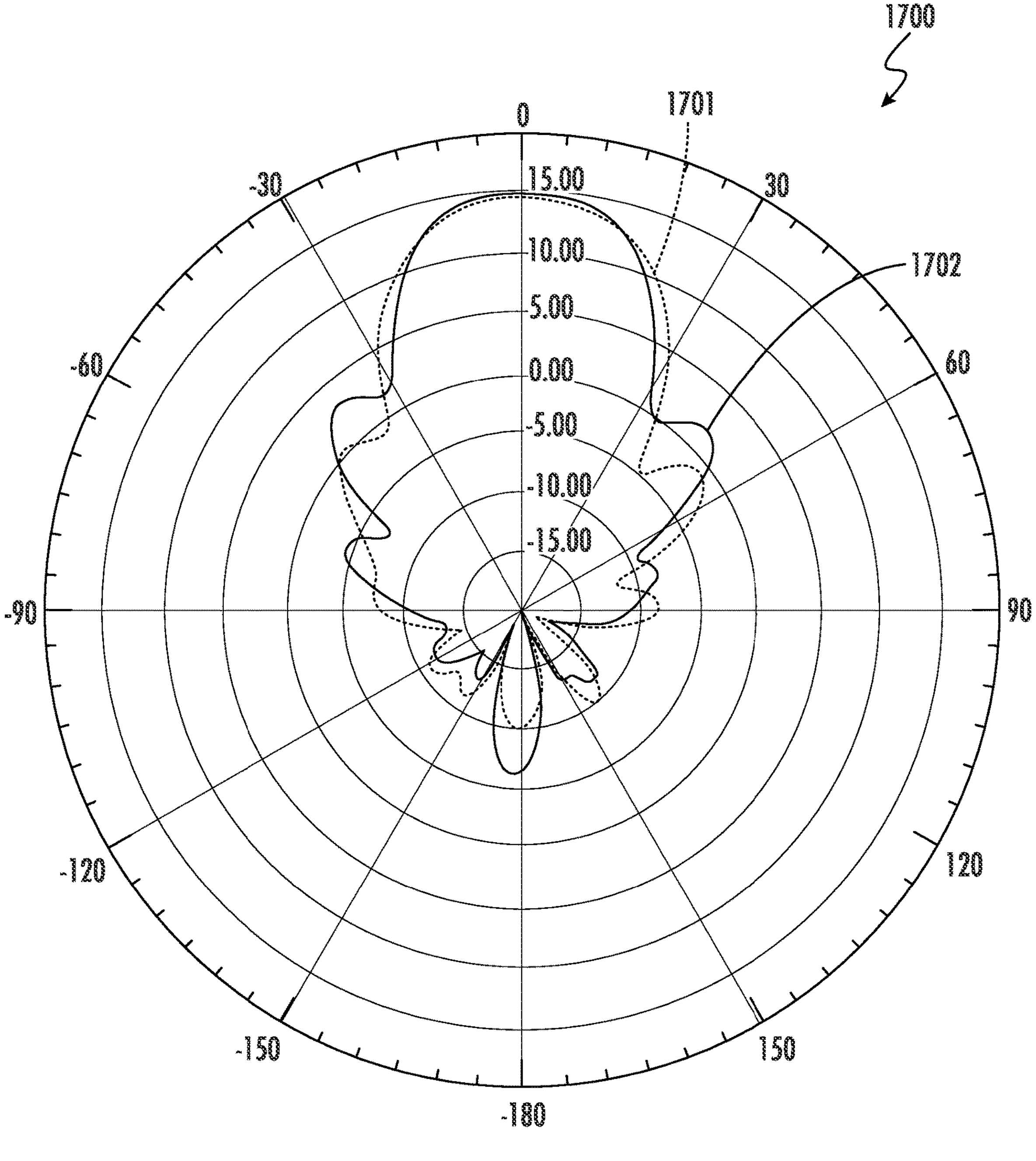
FIG. 17 is a diagram of a radiation pattern in the antenna of FIG. 12.

Referring now additionally to FIG. 15-17, the performance of an example embodiment of the communications device 700 is now described. Helpfully, the communications device 700 may provide for improved impedance, gain, and bandwidth. In diagram 1500, a curve 1501 shows the voltage standing wave ratio (VSWR) of example embodiment of the communications device 700. The horizontal line 1504 shows a minimum performance threshold (2:1 VSWR). Advantageously, the performance of the example embodiment of the communications device 700 exceeds this threshold, and is less than 1.3:1. More specifically, as will be appreciated, the L5 and L2 bands are shown with boxes 1502, 1503 (i.e. frequency bands in GPS L2 C/A and L5) respectively, and the performance of the example embodiment of the communications device 700 exceeds the required threshold within these bands.

In diagram 1600, curves 1601, 1602 respectively show the realized gain and RHCP gain of example embodiment of the communications device 700. The horizontal line 1603 shows a minimum performance threshold (14 dBi). Advantageously, the performance of the example embodiment of the communications device 700 exceeds this threshold. More specifically, as will be appreciated, the requirement GPS L5 and L2 bands are shown with boxes 1604, 1605 respectively, and the performance of the example embodiment of the communications device 700 exceeds the threshold within these bands. Coverage of L5, L2 and L1 is also possible with communications device 700 by rescaling the antenna size smaller. The 3 dB realized gain was 410 MHz or 41 percent. In diagram 1700, curves 1701, 1702 respectively show an elevation cut radiation pattern of the realized gain of the example embodiment of the communications device 700 at 1.18 Ghz and 1.222 Ghz. Helpfully, this performance exceeds 34° 3 dB beam width, back lobe 23 dB down, side lobes 12 to 14 dB down.

Figure 18:
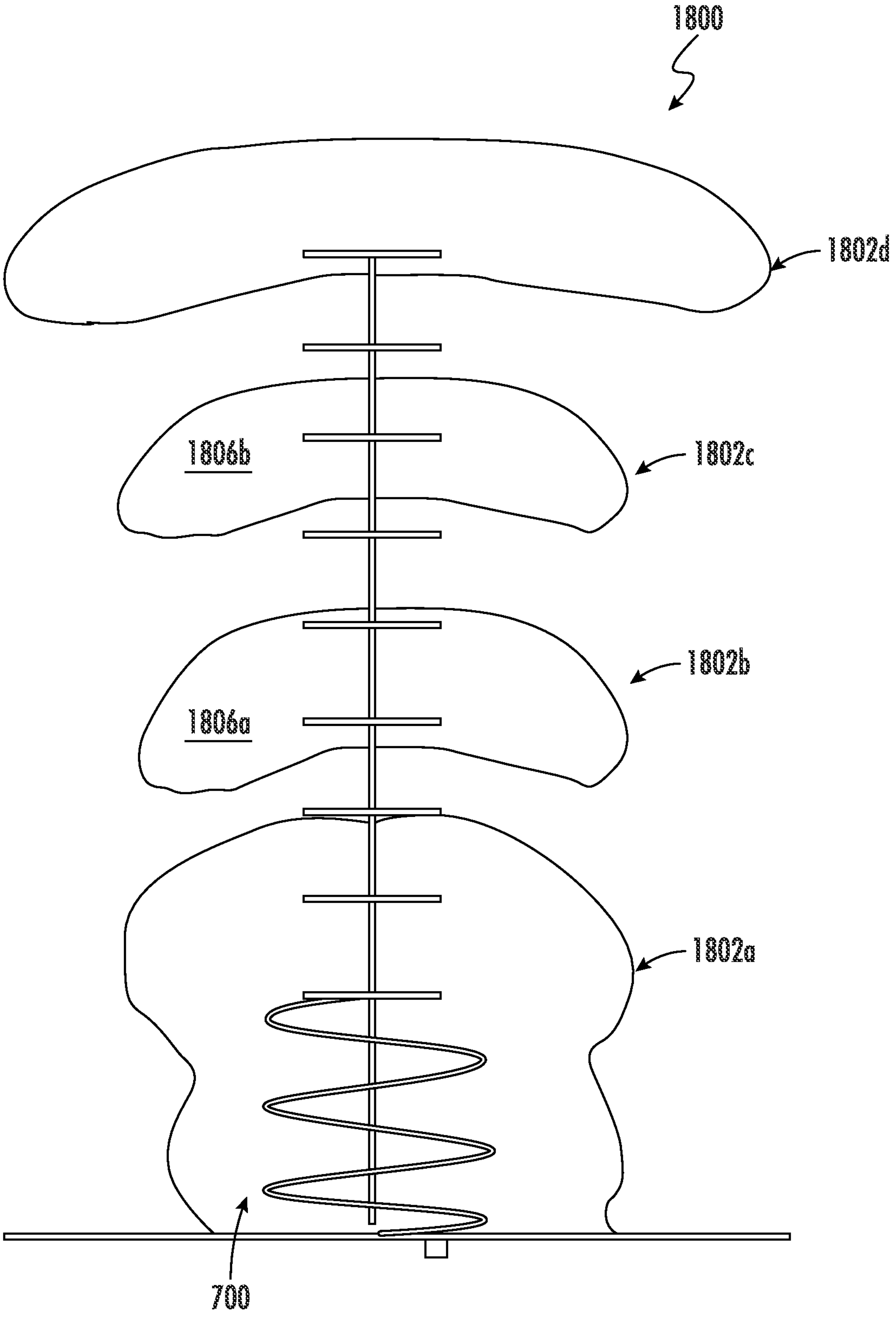
FIG. 18 is another diagram of a radiation pattern in the antenna of FIG. 12.

Referring now to FIG. 18, a diagram 1800 of a map of the radio waves surrounding a communications device 700 will be described to illustrate the communications device 700 principle of operation. The diagram 1800 illustratively includes 10 volt per meter contour lines 1802*a*-1802*d* that depict the E field distribution around the communications device 700 at an instant in time with one watt of applied power. The distal 10 volt per meter contour line 1802*d* constitutes a large radiating circular aperture where the fields expand rapidly. So, in a sense, the communications device 700 synthesizes the fields of a horn or dish antenna at communications device's distal end, although a horn or dish is, of course, not physically present. Field regions 1806*a*, 1806*b* constitute a guided traveling surface wave that will not radiate until that energy reaches the distal end of the communications device 700. If seen in motion during the operation of the communication device 700, the diagram 1800 would show a steady upwards movement in time of the 10 volt per meter contour lines 1802*a*-1802*d* along the communications device 700. Standing waves, such as occur in the common half wave dipole, are not present.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A communications device comprising:

a radio frequency (RF) device;

an antenna coupled to the RF device and comprising a conductive ground plane, an elongate support extending from the conductive ground plane, a helically wound conductive strip carried by a proximal end of the elongate support defining an auger-shape, and a plurality of spaced apart conductive elements carried by a distal end of the elongate support to define an RF lens for the helically wound conductive strip; and a cable coupling the RF device and the antenna, the cable being coupled to a longitudinal edge on a proximal end of the helically wound conductive strip, the cable being spaced apart from the elongate support.

2. The communications device of claim 1 wherein the conductive ground plane has a width greater than a diameter of the helically wound conductive strip.

3. The communications device of claim 1 wherein each of the plurality of spaced apart conductive elements comprises a circle-shaped conductive element.

4. The communications device of claim 1 wherein the helically wound conductive strip defines an imaginary cylinder having a diameter greater than a diameter of each of the plurality of spaced apart conductive elements.

5. The communications device of claim 1 wherein the cable comprises an inner conductor and an outer conductor surrounding the inner conductor to define a coaxial cable; wherein the outer conductor is coupled to the conductive ground plane; and wherein the inner conductor extends through the conductive ground plane and is coupled to the longitudinal edge on the proximal end of the helically wound conductive strip.

6. The communications device of claim 5 wherein the proximal end of the helically wound conductive strip defines a gap with adjacent portions of the conductive ground plane.

7. The communications device of claim 1 wherein the elongate support comprises a conductive material.

8. The communications device of claim 1 wherein the elongate support comprises a dielectric material.

9. The communications device of claim 1 wherein the antenna has an operating frequency; wherein each of the plurality of spaced apart conductive elements has a circumference between 0.9 and 1.1 wavelengths of the operating frequency; wherein adjacent spaced apart conductive elements of the plurality of spaced apart conductive elements have a spacing between 0.1 and 0.3 wavelengths of the operating frequency; and wherein the helically wound conductive strip has a diameter between 0.3 and 0.6 wavelengths of the operating frequency.

10. An antenna device for a radio frequency (RF) device, the antenna device comprising:

a conductive ground plane;

an elongate support extending from the conductive ground plane;

a helically wound conductive strip carried by a proximal end of the elongate support defining an auger-shape;

a plurality of spaced apart conductive elements carried by a distal end of the elongate support to define an RF lens for the helically wound conductive strip; and a cable feed point coupled between the RF device and a longitudinal edge on a proximal end of the helically wound conductive strip, the cable feed point being spaced apart from the elongate support.

11. The antenna device of claim 10 wherein the conductive ground plane has a width greater than a diameter of the helically wound conductive strip.

12. The antenna device of claim 10 wherein each of the plurality of spaced apart conductive elements comprises a circle-shaped conductive element.

13. The antenna device of claim 10 wherein the helically wound conductive strip defines an imaginary cylinder having a diameter greater than a diameter of each of the plurality of spaced apart conductive elements.

14. The antenna device of claim 10 wherein the cable feed point is carried by the conductive ground plane and is to be coupled to a coaxial cable comprising an inner conductor and an outer conductor surrounding the inner conductor with the outer conductor to be coupled to the conductive ground plane and the inner conductor to extend through the conductive ground plane and to be coupled to the proximal end of the helically wound conductive strip.

15. The antenna device of claim 14 wherein the proximal end of the helically wound conductive strip defines a gap with adjacent portions of the conductive ground plane.

16. The antenna device of claim 10 wherein the elongate support comprises a conductive material.

17. The antenna device of claim 10 wherein the elongate support comprises a dielectric material.

18. A method for making an antenna for a communications device, the method comprising:

coupling a helically wound conductive strip around a proximal end of an elongate support carried by a conductive ground plane defining an auger-shape;

coupling a plurality of spaced apart conductive elements to a distal end of the elongate support to define a radio frequency (RF) lens for the helically wound conductive strip; and coupling a cable feed point between an RF device and a longitudinal edge on a proximal end of the helically wound conductive strip, the cable feed point being spaced apart from the elongate support.

19. The method of claim 18 wherein the conductive ground plane has a width greater than a diameter of the helically wound conductive strip.

20. The method of claim 18 wherein each of the plurality of spaced apart conductive elements comprises a circle-shaped conductive element.

21. The method of claim 18 wherein the helically wound conductive strip defines an imaginary cylinder having a diameter greater than a diameter of each of the plurality of spaced apart conductive elements.

22. The method of claim 18 wherein the cable feed point is carried by the conductive ground plane and is to be coupled to a coaxial cable comprising an inner conductor and an outer conductor surrounding the inner conductor with the outer conductor to be coupled to the conductive ground plane and the inner conductor to extend through the conductive ground plane and to be coupled to the proximal end of the helically wound conductive strip.

* * * * *